United States Patent
Odani et al.

(10) Patent No.: US 6,243,864 B1
(45) Date of Patent: Jun. 5, 2001

(54) COMPILER FOR OPTIMIZING MEMORY INSTRUCTION SEQUENCES BY MARKING INSTRUCTIONS NOT HAVING MULTIPLE MEMORY ADDRESS PATHS

(75) Inventors: Kensuke Odani, Kyoto; Akira Tanaka, Yawata; Hirohisa Tanaka, Higashiosaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/116,136

(22) Filed: Jul. 15, 1998

(30) Foreign Application Priority Data

Jul. 17, 1997 (JP) .................................... 9-192262

(51) Int. Cl.[7] ...................................................... G06F 9/45
(52) U.S. Cl. ........................................ 717/9; 717/7; 717/8
(58) Field of Search ..................................... 717/9, 7, 5, 8

(56) References Cited

U.S. PATENT DOCUMENTS

| | | | |
|---|---|---|---|
| 5,107,418 | * 4/1992 | Cramer et al. ............................ | 717/9 |
| 5,119,495 | * 6/1992 | King ........................................ | 717/9 |
| 5,161,216 | * 11/1992 | Reps et al. .............................. | 717/4 |
| 5,179,702 | * 1/1993 | Spix et al. ............................. | 709/102 |
| 5,448,737 | * 9/1995 | Burke et al. ............................ | 717/9 |
| 5,555,412 | * 9/1996 | Besaw et al. ........................... | 717/8 |
| 5,555,417 | * 9/1996 | Odnert et al. .......................... | 717/7 |
| 5,673,425 | * 9/1997 | Iwashita ............................... | 712/227 |
| 5,713,010 | * 1/1998 | Buzbee et al. ........................ | 345/507 |
| 5,850,552 | * 12/1998 | Odani et al. ............................ | 717/9 |
| 5,854,934 | * 12/1998 | Hsu et al. .............................. | 717/9 |
| 6,000,028 | * 12/1999 | Chernoff et al. ..................... | 712/226 |
| 6,009,499 | * 12/1999 | Koppala ............................... | 711/132 |
| 6,091,897 | * 7/2000 | Yates et al. ............................. | 117/8 |

FOREIGN PATENT DOCUMENTS 6324881    6/1994  (JP) .

OTHER PUBLICATIONS

Title: Implementing the Java Virtual Machine; Java's Complex Instruction Set Can Be Built in Software or Hardware, Source: Microprocessor Report, (Mar. 25, 1996) vol. 10, No. 4.*
Title: Compliers put out for real–time users, Source: Electronic Engineering Times, (Apr.<12, 1993).*
Title: DOC: A practical approach to source level debugging of globally optimized code, author: Coutant et al, ACM, 1988.*
Title: Simple Compiler Algorithms to Reduce Ownership Overhead in Cache Coherence Protocols, author: Skeppstedt et al, ACM, 1994.*
Title: Inperprocedural Optimization: Eliminating Unnecessary Recompilation, author : Burke et al, ACM, 1993.*

* cited by examiner

Primary Examiner—Kakali Chaki
Assistant Examiner—Chameli C. Das

(57) ABSTRACT

Internal variables generated by a compiler are assigned to machine resources such as registers and memory by the resource assigning unit 11, and when the assembler code generation unit 18 has outputted an instruction sequence, the alias accessibility analyzing unit 19 registers memory access instructions in the instruction sequence in the assigned resource information 14 according to whether the instructions have a possibility of access by alias. The assembler code optimization unit 20 refers to the assigned resource information 14 and performs optimization at assembler level, thereby reducing the program size and execution time of the instruction sequence.

44 Claims, 16 Drawing Sheets

```
int func(int i, int j, int k)
{
    i++;
    k = k + k;
    :
    /* use i, j, k */
{
``` add 1, i
add k, k

| 1st LINE | add 1, D0 |
| 2nd LINE | mov (SP, 0), D1 |
| 3rd LINE | add D1, D1 |
| 4th LINE | mov D1, (SP, 0) |

① add 1, D0   ② mov (SP, 0), D1
D1
③ add D1, D1
↓ D1
④ mov D1, (SP, 0)

| 2nd LINE | mov (SP, 0), D1 |
| 1st LINE | add 1, D0 |
| 3rd LINE | add D1, D1 |
| 4th LINE | mov D1, (SP, 0) |

FIG. 2A  PRIOR ART mov (SP, 4), D1
sub 1, D1
mov D1,(SP, 4)
mov 3, D0
mov (SP, 4), D1
add D1, D0

FIG. 2B  PRIOR ART

| 1st LINE | mov (SP, 4), D1 | {} | |
| 2nd LINE | sub 1, D1 | {(SP,4), D1} | |
| 3rd LINE | mov D1,(SP, 4) | {} | |
| 4th LINE | mov 3, D0 | {(SP, 4), D1} | |
| 5th LINE | mov (SP, 4), D1 | {(SP, 4), D1} | {3, D0} |
| 6th LINE | add D1, D0 | {(SP, 4), D1} | {3, D0} |

FIG. 2C  PRIOR ART

| 1st LINE | mov (SP, 4), D1 | {} | |
| 2nd LINE | sub 1, D1 | {(SP,4), D1} | |
| 3rd LINE | mov D1,(SP, 4) | {} | |
| 4th LINE | mov 3, D0 | {(SP, 4), D1} | |
| ~~5th LINE~~ | ~~mov (SP, 4), D1~~ | ~~{(SP, 4), D1}~~ | ~~{3, D0}~~ |
| 6th LINE | add D1, D0 | {(SP, 4), D1} | {3, D0} |

1st LINE     add 1, D0
2nd LINE    mov D0,(A0)
3rd LINE    mov D1,(SP, 4)
4th LINE    mov (SP, 0), D1
5th LINE    add D1, D1
6th LINE    mov D1,(SP, 0)
7th LINE    mov (SP, 4), D1

FIG. 4A   PRIOR ART mov (SP,4), D1
sub 1, D1
mov D1,(SP, 4)
mov D1,(A0)
mov (SP, 4), D1
add D1, D0

FIG. 4B   PRIOR ART

| 1st LINE | mov (SP, 4), D1 | {} |
| 2nd LINE | sub 1, D1 | { (SP, 4), D1} |
| 3rd LINE | mov D1,(SP, 4) | {} |
| 4th LINE | mov D1,(A0) | {(SP, 4), D1} |
| 5th LINE | mov (SP, 4), D1 | {} |
| 6th LINE | add D1, D0 | {(SP, 4), D1} |

FIG. 4C   PRIOR ART

| 1st LINE | mov (SP, 4), D1 | {} |
| 2nd LINE | sub 1, D1 | { (SP, 4), D1} |
| 3rd LINE | mov D1,(SP, 4) | {} |
| 4th LINE | mov D1,(A0) | {(SP, 4), D1} |
| 5th LINE | mov (SP, 4), D1 | {} |
| 6th LINE | add D1, D0 | {(SP, 4), D1} |

SOURCE PROGRAM int a;

int func(int i, int j, int k, int *p)
{
```
*p = i + + ;
k = k + k ;
```
← a

:

/* use i, j, k, p */
{

INTERMEDIATE CODE STATE add 1, i
   mov i,(p)
   add k, k

RESOURCE ASSIGNING RESULT
   VARIABLE i = D0
   VARIABLE j = D1
   VARIABLE k = (SP, 0)

ASSEMBLER INSTRUCTION SEQUENCE

| | | |
|---|---|---|
| 1st LINE | add 1, D0 | |
| 2nd LINE | mov D0,(A0) | A |
| 3rd LINE | mov D1,(SP, 4) | B |
| 4th LINE | mov (SP, 0), D1 |  |
| 5th LINE | add D1, D1 | |
| 6th LINE | mov D1,(SP, 0) | |
| 7th LINE | mov (SP, 4), D1 | |

FIG. 9A

|  |  | CORRESPONDING VARIABLE | ANALYSIS OF ALIAS ACCESSIBILITY |
|---|---|---|---|
| 1st LINE | add 1, D0 | | |
| 2nd LINE | mov D0,(A0) | A0=VARIABLE P | ·····POSSIBLE |
| 3rd LINE | mov D1,(SP, 4) | SPILL-OUT | ·····IMPOSSIBLE |
| 4th LINE | mov (SP, 0), D1 | (SP,0)=LOCAL VARIABLE | ·····IMPOSSIBLE |
| 5th LINE | add D1, D1 | | |
| 6th LINE | mov D1,(SP, 0) | (SP,0)=LOCAL VARIABLE | ·····IMPOSSIBLE |
| 7th LINE | mov (SP, 4), D1 | SPILL-IN | ·····IMPOSSIBLE |

FIG. 9B

| LINES WHERE ACCESS BY ALIAS IMPOSSIBLE | ADDRESSING CODE |
|---|---|
| 3rd LINE | (SP, 4) |
| 4th LINE | (SP, 0) |
| 6th LINE | (SP, 0) |
| 7th LINE | (SP, 4) |

FIG. 13A

SOURCE PROGRAM j = j − 1
*p = i
i = i + j

FIG. 13B

RESOURCE ASSIGNING RESULT
VARIABLE j = (SP, 4)
VARIABLE i = D0

FIG. 13C

ASSEMBLER INSTRUCTION SEQUENCE mov (SP, 4), D1
sub 1, D1
mov D1, (SP, 4)
mov D0, (A0)
mov (SP, 4), D1
add D1, D0

FIG. 14A

|  |  | CORRESPONDING VARIABLE | ANALYSIS OF ALIAS ACCESSIBILITY |
|---|---|---|---|
| 1st LINE | add (SP, 4), D1 | LOCAL VARIABLE | ······IMPOSSIBLE |
| 2nd LINE | sub 1, D1 | | |
| 3rd LINE | mov D1,(SP, 4) | LOCAL VARIABLE | ······IMPOSSIBLE |
| 4th LINE | mov D0,(A0) | A0=VARIABLE P | ······POSSIBLE |
| 5th LINE | mov (SP, 4), D1 | LOCAL VARIABLE | ······IMPOSSIBLE |
| 6th LINE | add D1, D0 | | |

FIG. 14B

ASSIGNED RESOURCE INFORMATION

| LINES WHERE ACCESS BY ALIAS IMPOSSIBLE | ADDRESSING CODE |
|---|---|
| 1st LINE | (SP, 4) |
| 3rd LINE | (SP, 4) |
| 5th LINE | (SP, 4) |

FIG. 15

|  | EQUIVALENCE ANALYSIS | BEFORE INSTRUCTION EXECUTION | AFTER INSTRUCTION EXECUTION |
|---|---|---|---|
| 1st LINE | mov (SP, 4), D1 | {} | { (SP, 4), D1} |
| 2nd LINE | sub 1, D1 | {(SP,4), D1} | {} |
| 3rd LINE | mov D1,(SP, 4) | {} | {(SP, 4), D1} |
| 4th LINE | mov D0,(A0) | {(SP, 4), D1} | {(SP, 4), D1} |
| 5th LINE | mov (SP, 4), D1 | {(SP, 4), D1} | {(SP, 4), D1} |
| 6th LINE | add D1, D0 | {(SP, 4), D1} | {(SP, 4), D1} |

FIG. 16

DELETION OF REDUNDANT INSTRUCTIONS

| 1st LINE | mov (SP, 4), D1 |
| 2nd LINE | sub 1, D1 |
| 3rd LINE | mov D1,(SP, 4) |
| 4th LINE | mov D0,(A0) |
| 6th LINE | add D1, D0 |

.... 5th LINE DELETED

COMPILER FOR OPTIMIZING MEMORY INSTRUCTION SEQUENCES BY MARKING INSTRUCTIONS NOT HAVING MULTIPLE MEMORY ADDRESS PATHS

BACKGROUND OF THE INVENTION

1. Field of the Invention

The present invention relates to an optimization apparatus for optimizing instruction sequences that have been converted into machine language or assembler language, and to a compiler for converting a source program in high-level language into an instruction sequence written in machine language or assembler language.

2. Description of the Prior Art

Optimization at an intermediate code level is performed after writing a source program and converting this into intermediate code. By performing optimization, the code size and/or execution time of the final program can be suitably improved. However, regardless of whether the program generated after optimization is composed of assembler instruction sequences (hereinafter simply called an "assembler program") or machine language sequences (hereinafter simply called a "machine language program"), such programs often include redundant code or instruction sequences that cause execution delays.

When improvements to code size and/or execution time are strongly desired, optimization processes such as instruction scheduling, the deletion of redundant instructions, and copy propagation are performed on the assembler code or machine code generated by a compiler.

Optimization at assembler language level or machine language level is achieved by instruction scheduling or by deleting redundant transfer instructions using equivalence groups. Note that the following explanation focuses on the case where optimization is performed at assembler language level.

Instruction Scheduling

The following is a description of instruction scheduling as a first conventional example of optimization at assembler language level.

In recent years, pipeline architecture has been increasingly used in microprocessors to speed up processing. To achieve the full potential of pipeline architecture, the pipeline needs to be continuously filled with instructions.

Depending on the structure of the pipeline, different instruction sequences can produce gaps in the pipeline. As one example, for a 5-stage pipeline single scalar machine whose a pipeline is composed of an IF (instruction fetch), a DEC (instruction decode), EX (execute), MEM (memory operation), and WB (register write) stages, it is not possible for an instruction to refer to a value that has just been loaded from the memory (hereinafter referred to as "load-refer sequence"). When instructions are arranged in this order, a gap will appear in the pipeline, causing a delay. To avoid the generation of such delays, instruction scheduling needs to be performed for this machine to separate the load-refer sequence. In a compiler whose target is a pipeline-architecture machine, an optimization process called instruction scheduling is performed to separate the load-refer sequence and so allow the pipeline architecture to be used to its full potential.

Instruction scheduling is a process of reediting the arrangement of instructions to suit a pipeline architecture. The arrangement of instructions especially refers to the relations between a given instruction and its preceding and succeeding instructions, so that reediting involves the interchanging of certain pairs of instructions within a program.

Scheduling may be performed in two different ways, first by considering the pipeline structure of the target machine to avoid pipeline hazards, and secondly by efficiently supplying instructions to a parallel conversion unit. Since the degree to which the pipeline can be filled depends on the order in which instructions are supplied, the full potential of the pipeline may be realized by rearranging the order of the instructions.

It should be noted here that the interchanging of instructions needs to be performed very carefully. Should instructions be simply interchanged without regard for the consequences, there is a real risk of a breakdown in the algorithm of the program. To avoid this, instructions in the program need to be classified into those which cannot be interchanged (hereinafter "inviolable") and those which can.

Inviolable instructions are a pair of instructions that cannot be interchanged. To establish which pairs of instructions are inviolable, instructions that cannot be interchanged are detected and directed links are established between them.

Definition-Reference links, reference-definition links, and definition-definition links are patterns of the directed links that are conventionally formed between inviolable instructions. These are described in more detail below.

Definition-reference Links

Definition-reference links are directed links which show that the order of an instruction defining a resource and a later instruction referring to the resource is inviolable. One example is the following pair of instructions.

(1) mov 100,D0

(2) add D0,D1

In the above instruction sequence, the data flow is dependent on the register D0. As a result, the interchanging of instructions will result in the breakdown of the data flow. Accordingly, when instruction scheduling is performed, directed links clearly show the inviolable relation between the instruction that defines the resource and the instruction that refers to it.

Reference-definition Links

Reference-definition links are directed links that show the inviolability of the relation between an instruction that refers to a resource and an instruction that redefines the resource. The following is an example instruction sequence that will be used to explain why reference-definition links also need to be examined when rearranging the instructions.

(1) mov 100,D0

(2) add D0,D1

(3) mov 200,D0

(4) add D0,D1

In the above instruction sequence, the data flow in instructions (1)–(2) is dependent on the register D0. The data flow in instructions (3)–(4) is similarly dependent on the register D0. Suppose here that the instruction sequence is rearranged into the order (1)-(3)-(2)-(4). In this order, the definition-reference order is maintained as described above, although if the machine language program is executed in this state, 200 will be added to the value in the register D1, changing the meaning of the machine language program. Accordingly, the dependence on the register D0 in instructions (2)–(3) is preserved as a reference-definition link, so that a clear indication of the inviolability of these instructions is given.

Definition-definition Links

Definition-definition links are directed links that show the inviolability of the order of an instruction that defines a given resource and another instruction that redefines the resource. The following is an example instruction sequence that will be used to explain why definition-definition links also need to be examined when rearranging the instructions.

(1) mov 100,D0
(2) mov 200,D0
(3) add D0,D2

In the above instruction sequence, the data flow in instructions (2)–(3) is dependent on the register D0. As a result, a definition-reference link is set between instructions (2) and (3). In this example, instruction (1) is also a definition of register D0. Supposing here that the instruction sequence is rearranged to become (2)-(1)-(3), the execution of the rearranged instruction sequence will result in 100 being added to register D2, which changes the meaning of the machine language program. To avoid such erroneous rearranging of the program, the dependence on the register D0 in instructions (1)–(2) is preserved as a definition-definition link in the dependence graph.

The following is an explanation of conventional instruction scheduling by way of an example program. The construction of a conventional compiler is shown in FIG. 5. The following example deals with the case when processing the program shown in FIG. 1A. The program is first inputted into the analyzing unit 81, is analyzed, and is then converted into intermediate code. The intermediate code at this stage is shown in FIG. 1B. Next, the resource assigning unit 82 assigns the variables in the intermediate code to registers or memory. In this example, the variable i is assigned to the register D0, while the variable k is assigned to the memory address (SP,0). Based on this assigning, the assembler instruction generation unit 84 then generates the assembler program shown in FIG. 1C. As shown in FIG. 1C, the load instruction "mov (SP,0),D1" which loads a value from memory is directly followed by the instruction "add D1,D1" which refers to the loaded value. As a result, this sequence will result in a delay (load-refer). This sequence is next given to the instruction scheduling unit 85. This instruction scheduling unit 85 is composed of the dependence graph generation unit 86 and the instruction rearranging unit 87. Assembler instructions that are given to the instruction scheduling unit 85 are first inputted into the dependence graph generation unit 86 which generates a dependence graph corresponding to the inputted assembler instructions. The dependence graph shows the resource dependency between instructions and so defines the execution order of instructions. When the two instructions A and B are shown as being joined "A→B" in the dependency graph, this means that the instruction A needs to be executed before instruction B. The dependency graph generated by the dependence graph generation unit 86 in the present example is shown in FIG. 1D.

The position where a delay is caused in FIG. 1D is shown by the cross. On completing the dependency graph, the dependence graph generation unit 86 inputs it into the instruction rearranging unit 87. The instruction rearranging unit 87 then heuristically rearranges the instructions in the program to make the best possible use of the pipeline of the target machine, while not violating the dependency graph. The assembler language program that has been rearranged by the instruction rearranging unit 87 is shown in FIG. 1E. In comparison with the program shown in FIG. 1C, the program in FIG. 1E has the instruction "add 1,D0" located between the load and reference instructions, with the separation of the load and reference instructions in FIG. 1E acting to prevent the generation of the delay (as shown by the circle in FIG. 1E). The code composed of these rearranged instructions is then inputted into the code output unit 88. The code output unit 88 outputs a file containing the inputted instructions as a machine language or assembler language program.

Removal of Redundant Transfer Instructions

The following is an explanation of the deletion of redundant transfer instructions as the second conventional example of optimization at assembler program level.

The expression "redundant transfer instructions" here refers to the transfer instructions that go to the trouble of transferring a value even though equivalency is already established between the resources involved in the transfer.

An "equivalent relation" shows that a resource indicated as the destination of a transfer instruction has the same stored value as a resource indicated as the source of a transfer instruction once the transfer instruction is executed.

The equivalent relations which are valid for each instruction are expressed using equivalence groups. An equivalence group is a group of resources that exhibit an equivalent relation with each other. More specifically, these groups are expressed using register names and addressing codes that specify access addresses in memory.

FIGS. 2A and 2B show an optimization process which uses equivalence groups. Here, FIG. 2B shows the equivalence groups that are present just before the execution of each instruction in the example program shown in FIG. 2A.

As shown in FIG. 2B, the equivalence group {(SP,4),D1} is established just before the execution of the instruction on the second line of the example program. This means that the stored value of the register D1 is equal to the value al the memory address (SP,4). Meanwhile, the equivalence groups {(SP,4),D1} and {3,D0} are established just before the execution of the instruction on the fifth line, showing that the stored value of the register D1 is equal to the value at the memory address (SP,4) and that the stored value of the register D0 is equal to the immediate 3.

Of particular note in FIG. 2B is that an equivalent relation is established between the stored value of the register D1 and the memory address (SP,4) after the execution of the instruction on the fourth line and before the execution of the instruction on the fifth line. In spite of this, the instruction on the fifth line is a transfer instruction transfers the value at the memory address (SP,4) into the register D1. Accordingly, this transfer from the memory address (SP,4) into the register D1 is redundant, and so can be deleted. The result of this deletion is shown in FIG. 2C.

The conventional optimization methods performed at assembler language level or machine language level have however been subject to many restrictions due to the presence of definition instructions that use indirect addressing.

A first restriction with conventional instruction scheduling is that the movement of an instruction across a definition or reference instruction that uses indirect addressing is prohibited, thereby restricting the freedom with which instruction scheduling can be performed. The reason such movement is prohibited is explained below. Wit a definition instruction that uses indirect addressing, the memory address in which a value should be written cannot be clearly ascertained from the code. If a memory access instruction is positioned before or after an instruction which uses indirect addressing, there is the possibility that the indirect addressing instruction and the other memory access instruction will access the same memory address. Even if the probability of this actually happening is small, optimization of instructions that involves moving instructions across indirect addressing instructions should be completely avoided.

FIG. 3A shows an example of an instruction sequence before instruction sequencing is performed. In FIG. 3A, the instruction "mov D0,(A0)" on the second line is a memory access instruction that defines a value at a memory address that is indicated through indirect addressing (such instructions also being known as "memory definition instructions"). The memory address affected by this instruction is determined from the stored value in the address register A0. However, it is impossible to determine what value is stored in this address register A0 from the example program shown in FIG. 3A. When it is unclear into what memory address a value should be written by an indirect addressing definition instruction, all memory access instructions starting from an indirect addressing definition instruction need to be interpreted as having an inviolable relationship with this indirect addressing definition instruction.

In the example program of FIG. 3A, the instructions o the third, fourth, sixth and seventh lines all access the stack region of the memory, and since the instruction on the second line is an indirect addressing definition instruction, there is the possibility that this definition instruction will access the same memory address as one of these following instructions. As a result, the indirect addressing definition instruction on the second line is interpreted as having an inviolable relationship with the instructions on the third, fourth, sixth, and seventh lines.

FIG. 3B shows an example dependency graph. In this dependency graph, directed links are established between instructions where there is an inviolable relation. These directed links are formed between the second and third lines, the second and fourth lines, the second and sixth lines, and the second and seventh lines. If, in this way, an indirect addressing definition instruction has directed links with as many as four instructions, this represents a great restriction to the freedom with which the instructions can be rearranged. In the instruction sequence shown in FIG. 3A, even though a hazard is present between the instructions on the fourth and fifth lines, the directed links shown in FIG. 3B show that the arrangement of instructions cannot be freely adjusted, preventing the removal of the hazard.

A second problem relates to the deletion of redundant transfer instructions using equivalent relations. Since equivalence groups are destroyed before and after definition instructions that use indirect addressing, there are cases when it is not possible to delete redundant instructions present in the program.

FIG. 4B shows the result of optimization of the program example shown in FIG. 4A when analyzing equivalent relations. In FIG. 4B, equivalence groups are destroyed by the fifth line due to the presence of the indirect addressing definition instruction on the fourth line. In the indirect addressing definition instruction "mov D1,(A0)", the memory address (A0) is determined as the address indicated by the address register A0. However, it is impossible to determine what value is stored in this address register A0 from the example program shown in FIG. 4A. When it is unclear into what memory address a value should be written by an indirect addressing definition instruction, all memory resources in the equivalence groups preceding the indirect addressing memory access instruction need to be removed.

In the present example, a transfer instruction that transfers a value from the memory address (SP,4) to the data register D1 in present on the fifth line. Since the equivalence group that includes the address (SP,4) and the data register D1 is destroyed because of the indirect addressing definition instruction on the fourth line, this redundant transfer instruction on the fifth line cannot be deleted.

SUMMARY OF THE INVENTION

In view of the stated problems, it is an object of the present invention to provide an optimization apparatus and compiler that can limit reductions in the efficiency of optimization at assembler code level due to indirect addressing of the memory.

The following is a discussion of the root of this problem and the focal points for its solution.

Root of the Problem

The root of the problem is the generation by a compiler of memory access instructions that use indirect addressing. The reason such instructions are generated by a compiler is due to the compiler trying to faithfully translate statements in the source program where access by alias is performed.

Access by alias refers to when the storage location of a numerical value referred to in the source program using a variable name is also specified another variable in a different format. In the following example program that is composed of the statements (1) to (3), the storage location of the numerical value referred to in the program as the variable a is also specified using the pointer variable *p, so that access by alias is possible for the statement which includes the variable name a.

(1) a=10
(2) p=&a
(3) *p=20

In this source program, statement (1) states that the numerical value 10 is to be stored in the storage address referred to as the variable name a. Following this, statement (2) states that the address &a of the storage location of the numerical value 10 should be copied into the pointer variable p. As a result of this copying, access by alias becomes possible for this storage location. Statement (3) uses the alias to redefine the stored value of this storage location. This is to say, statement (3) states that the numerical value 20 is to be written into the storage location of the numeric value 10 that is indicated using the pointer variable *p.

When the source program is written in this way, the storage location of the numerical value referred to as the variable a can also be accessed using the variable name *p.

When an assembler program is generated from this source program where access by alias is possible, the possibility for access by alias for a variable in the source program will be inherited by the generated assembler program.

The inheritance of the possibility of access by alias means that one memory address is expressed in a variety of forms of code, such as by an absolute address, an indirect address using an address register, or an indirect address indicated using the stack pointer.

To check whether memory access instructions perform access by alias for a same access target, it is necessary to trace the data flow between basic blocks in the program. This is very difficult to achieve. The analysis of memory access instructions that perform access by alias is also made even more difficult by the inclusion of a function call within a function in the program.

Focal Points for the Solution of the Problem

The focal points for the solution of the above problem by the present application are the following two types of memory access instructions.

① Memory access instructions whose access targets correspond to variables that are not present in the program coded by the user.

② Memory access instructions whose access targets correspond to memory addresses that are not operated by other functions and which are operated by the user via an alias within the same function.

Memory access instructions classified as type ① are spill-out instructions, spill-in instructions, and memory access instructions whose access target corresponds to a temporary variable. Memory access instructions classified as type ② are memory access instructions whose access target corresponds to a local variable that are not subjected to address referencing. These different types of instructions are described in more detail below.

Local Variables

Local variables are variables whose live range is enclosed within a function. Accordingly, such variables are not operated upon by other functions. If a local variable is not subjected to address referencing within a function, the storage location of the stored value of the variable will not be operated upon by another variable, such operations being called "indirect access".

Local variables are assigned to the stack region of memory by the compiler. Addresses in the stack region are accessed through indirect addressing in the form (SP,2) or (SP,4), with the use of a different stack pointer or displacement ensuring that different regions are used. The size of the displacement in the variable is calculated based on the size of the stored value of the local variables. As one example, if the size of the local variables is two bytes, the displacement may be set at an integer multiple of two bytes. By doing so, it can be ensured that the stored values of local variables will not be stored in overlapping memory locations within the stack region.

Temporary Variables

Temporary variables are variables that are temporarily generated by the compiler to store the intermediate results of operations. The memory locations of temporary variables are also determined by the compiler, so that the user program will not include code that operates these storage locations.

Spill-Out Instructions and Spill-In Instructions

Spill-out instructions are assembler instructions that save a valid value of a register into the memory when there is a spill, which is to say, when there are insufficient registers during resource assignment. Spill-in instructions, meanwhile, are instructions that restore a valid value into a register when the value becomes necessary. The memory location used for saving when a spill occurs is normally determined by the compiler, so that the user program will not include code that operates these storage locations.

Since it is clear that there will be no access by alias for (1) memory access instructions that have been generated from temporary variables, (2) memory access instructions that have been generated from local variables whose address is clearly not referred to, (3) spill-out instructions, and (4) spill-in instructions, it is possible to analyze the memory access instructions included in a generated assembler program to find and mark the above four types (1) to (4) of memory access instructions.

The optimizing of the instruction sequence is then performed by referring to see which memory access instructions have been marked. By performing optimization in this way, the restrictions caused by the presence of memory access instructions that use indirect addressing can be eased, so that further improvements can be made to the code size and/or execution time of the finally generated program.

Supplementary Explanation

Definition instructions in indirect addressing format that use the stack pointer register (such as mov D1, (SP,4)) are not considered by the present specification to be definition instructions that use indirect addressing. This is because while the code that is usually generated by a compiler is such that the stack pointer has a fixed value for each function, the present specification deals with the case when the stack pointer register has a fixed value overall.

The stated object of the present invention can be realized by an optimizing apparatus for optimizing a sequence of instructions obtained by translating a source program composed of statements written in a programming language, the optimizing apparatus including: an extracting unit for extracting memory access instructions, which specify a memory address corresponding to a variable included in the statements as an access target, from the sequence of instructions; a judging unit for judging, for each extracted memory access instruction, whether the variable corresponding to the access target is accessed by an operation involving another variable in the source program; an appending unit for adding a mark, showing that there is no possibility of access by alias, to each extracted memory access instruction whose access target is judged as not being accessed by an operation involving another variable; and an optimizing unit for referring to the marks appended by the appending unit and optimizing the sequence of instructions.

With the stated construction, memory access instructions that are located on either side of a memory access instruction that uses indirect addressing are analyzed and instructions whose access target will not be subjected to access by alias are marked to show this is the case. When optimizing the instruction sequence, the optimization unit first refers to these marks. Even when a memory access instruction that uses indirect addressing is present in a basic block, the optimization of the basic block can be performed without reductions in program efficiency. As a result, reductions in execution time and/or program size can be made.

Here, the judging unit may include a first judging unit for judging whether the variable corresponding to the access target of a memory access instruction is a local variable that is not subjected to address referencing in the source program, the appending unit adding a mark showing that there is no possibility of access by alias for a memory access instruction that has been generated from a statement that includes the variable judged by the first judging unit to be a local variable that is not subjected to address referencing.

With the stated construction, the present invention judges that memory access instructions that access a memory address corresponding to a local variable will not be subjected to access by alias and adds a mark showing this, so that instructions where access by alias is not possible can be easily detected.

Here, the judging unit may include a second judging unit for judging whether the variable corresponding to the access target of a memory access instruction is a temporary variable that has been inserted out of convenience into an intermediate code statement when the statements in the source program are converted into intermediate code statements, the appending unit adding a mark showing that there is no possibility of access by alias for a memory access instruction that has been generated from an intermediate code statement that includes the variable judged by the second judging unit to be a temporary variable.

With the stated construction, the present invention judges that memory access instructions that access a memory address corresponding to a temporary variable will not be subjected to access by alias and adds a mark showing this, so that instructions where access by alias is not possible can be easily detected.

Here, the judging unit may include a third judging unit for judging whether the access target of a memory access instruction is a saving destination for a stored value of a register, the appending unit adding a mark showing that there is no possibility of access by alias for a memory access instruction that has an access target judged by the third judging unit to be a saving destination for a stored value of a register.

With the stated construction, the present invention judges that memory access instructions that access a memory address corresponding to a saving location of a stored value of a register will not be subjected to access by alias and adds a mark showing this, so that instructions where access by alias is not possible can be easily detected.

Here, the optimizing unit may include: a detecting unit for detecting all memory access instructions in the sequence of instructions; a selecting unit for selecting a memory access instruction, out of the detected memory access instructions, that has not been given a mark; a link forming unit for forming a directed link between a memory access instruction that uses indirect addressing and a memory access instruction selected by the selecting unit to show that an order of a pair of linked instructions cannot be reversed; and a scheduling unit for rearranging the sequence of instructions to suit a pipeline architecture, while ensuring the orders of pairs of linked instructions are not reversed.

With the stated construction, directed links which show the pairs of instructions whose order is inviolable are not formed between indirect memory access instructions and memory access instructions for which access by alias is not possible. Accordingly, only a small number of directed links are required between instructions, so that the content of the instructions can be rearranged with greater freedom. As a result, the instructions can be flexibly rearranged into an order that suits a pipeline architecture.

Here, the scheduling unit may extract a pair of instructions that cause a hazard from the sequence of instructions and inserts a different instruction between the pair of instructions when rearranging the sequence of instructions.

With the stated construction, the present invention can perform scheduling so that other instructions are inserted into the two-instruction pattern that causes a delay in a pipeline architecture. As a result, the execution time of the finally produced program can be improved.

Here, the optimizing unit may include: an extracting unit for extracting an instruction that uses indirect addressing from the sequence of instructions; a generating unit for generating an equivalence code group composed of all resource codes specified as an access target of any of a register access instruction and a memory access instruction, for the extracted instruction that uses indirect addressing; an equivalent relation deleting unit for deleting all resource codes that are not an access target of an instruction that has been given a mark from the equivalent code group; and a transfer instruction deleting unit for judging whether any instruction located after the memory access instruction that uses indirect addressing is redundant, based on the equivalent code group after deletion of resource codes by the equivalent relation deleting unit, and for deleting each instruction judged as redundant.

With the stated construction, when an equivalence group is present before and after a memory access instruction that uses indirect addressing, the present invention can avoid the precautionary deletion of the entire equivalence group due to the access target of the memory access instruction that uses indirect addressing being indefinite. Of the addressing codes included in the equivalence group, codes which have no possibility of access by alias are not deleted. Since this reduces the number of equivalence relations that are deleted, a larger number of redundant memory access instructions can be detected after the memory access instruction that uses indirect addressing.

Here, the optimizing unit includes: an extracting unit for extracting a transfer instruction from the sequence of instructions as a processed instruction; a detecting unit for detecting a transfer instruction that has a reference target resource of the processed instruction as a definition target resource; a first generating unit for generating an equivalence code group composed of all resource codes specified as an access target of register access instructions and memory access instructions, for the detected transfer instruction; an equivalent relation deleting unit for deleting, from the equivalent code group, all resource codes that are not an access target of an instruction that has been given a mark; a judging unit for referring to the equivalent code group, after resource code have been deleted by the equivalent relation deleting unit, and judging whether it is possible to replace the reference target resource of the processed instruction with the reference target resource of a detected transfer instruction; a replacement executing unit for replacing the reference target resource of the processed instruction when replacement has been judged possible; and a transfer instruction deleting unit for deleting the transfer instruction detected by the detecting unit after the replacement has been completed.

With the stated construction, when an equivalence group is present before or after a memory access instruction that uses indirect addressing, the present invention avoids the precautionary deletion of the entire equivalence group due to the access target of the memory access instruction that uses indirect addressing being indefinite. Of the addressing codes included in the equivalence group, codes which have no possibility of access by alias are not deleted. Since this reduces the number of equivalence relations that are deleted, the replacement of the reference target of transfer instructions and the deletion of redundant transfer instructions can be more favorably performed.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2A shows a conventional example of an assembler instruction sequence;

FIG. 2B shows an example of the equivalence groups generated from the assembler instructions shown in FIG. 2A;

FIG. 2C shows an example of the deletion of redundant transfer instructions using the equivalence groups shown in FIG. 2B;

FIG. 4A shows an example of an assembler instruction sequence that includes a memory access instruction which uses indirect addressing;

FIG. 4B shows examples of the equivalence groups that are generated from the assembler instructions shown in FIG. 4A;

FIG. 4C shows the result of attempting to delete an equivalent resource transfer instruction using the equivalence groups shown in FIG. 4B;

FIG. 9A shows an example result of the analysis of alias accessibility by the alias accessibility analyzing unit 19;

FIG. 9B shows an example of the assigned resource information;

FIG. 13A shows an example of a source program;

FIG. 13B shows an example result of resource assigning;

FIG. 13C shows an example of an assembler instruction sequence;

FIG. 14A shows an example result of the analysis of alias accessibility by the alias accessibility analyzing unit 19;

FIG. 14B shows an example of the assigned resource information;

FIG. 15 shows an example of the analyzing result of equivalence groups;

FIG. 16 shows an example of a program where transfer instructions have been deleted using the analysis result of the equivalence groups.

DESCRIPTION OF PREFERRED EMBODIMENTS

The following is a description of two embodiments of the present invention. These embodiments refer to the figures, and describe compilers that include an optimization apparatus.

Figures 1A, 1B, 1C, 1D, 1E:
FIG. 1A shows an example of a source program.
FIG. 1B shows an example of a program after conversion into intermediate code.
FIG. 1C shows an example of an assembler instruction sequence.
FIG. 1D shows an example dependence graph.
FIG. 1E shows an example result of scheduling using the dependence graph shown in FIG. 1D.
Figures 3A, 3B:
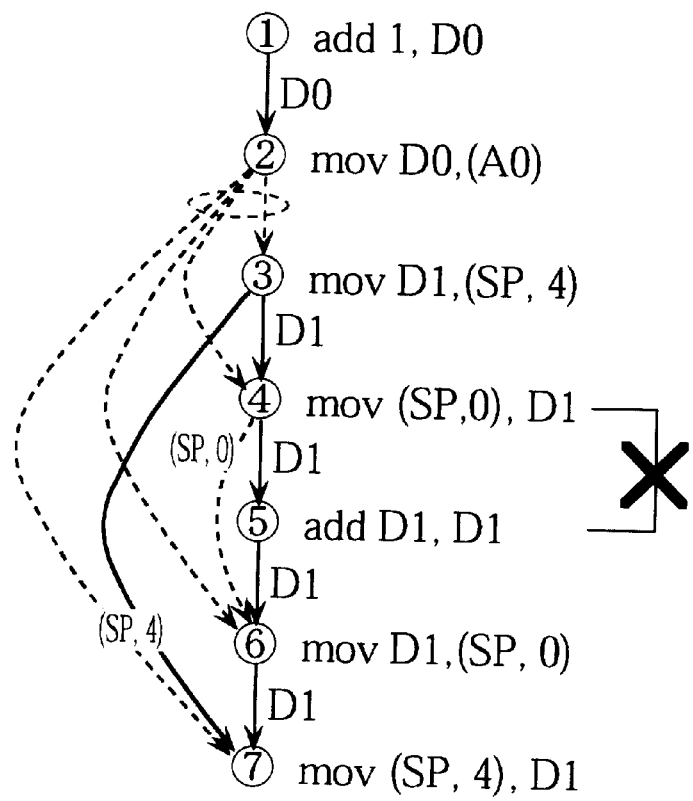
FIG. 3A shows an example of an assembler instruction sequence that includes a memory access instruction which uses indirect addressing.
FIG. 3B shows an example of a dependence graph that is generated from the assembler instructions shown in FIG. 2A.
Figure 5:
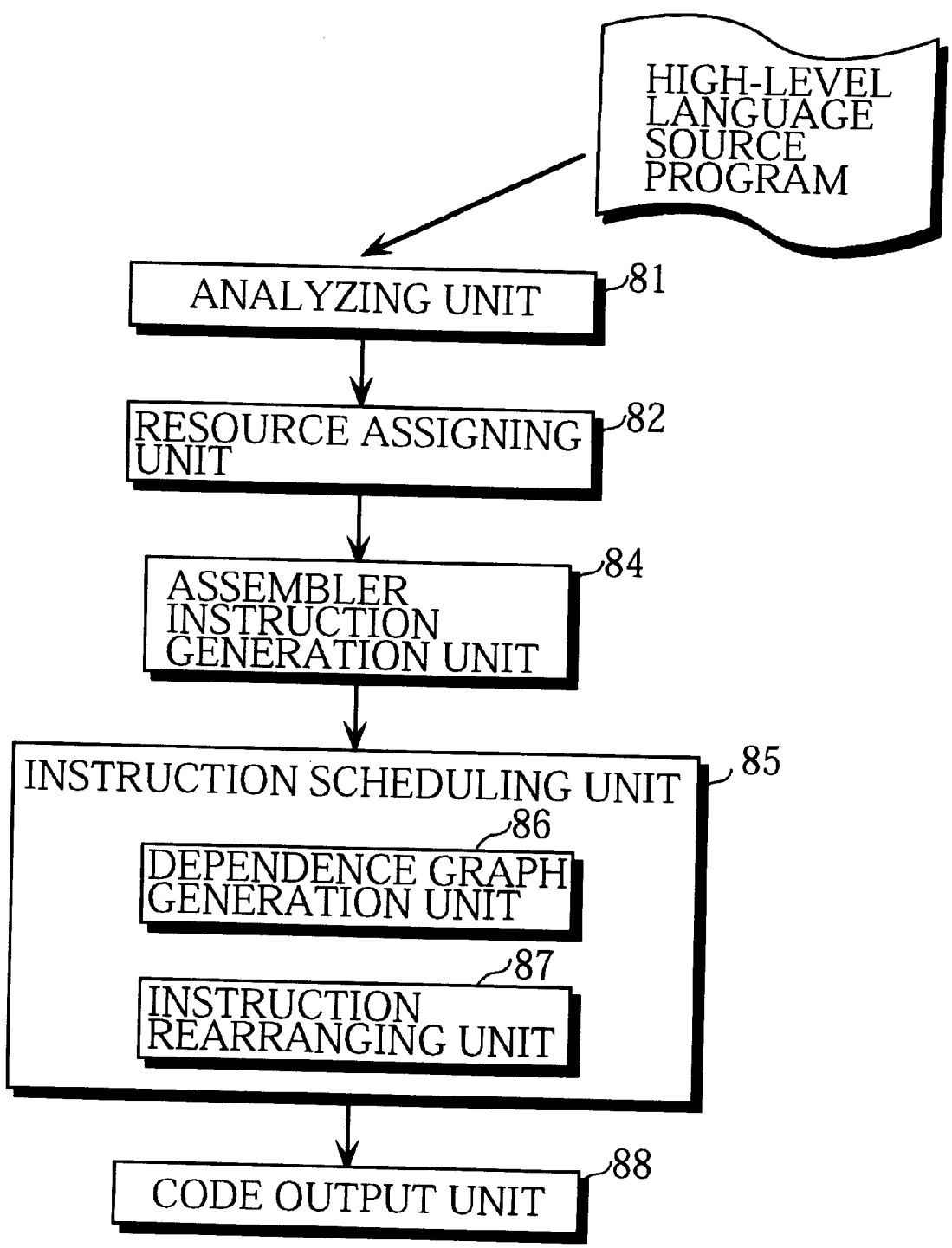
FIG. 5 shows the construction of a conventional compiler.
Figure 6:
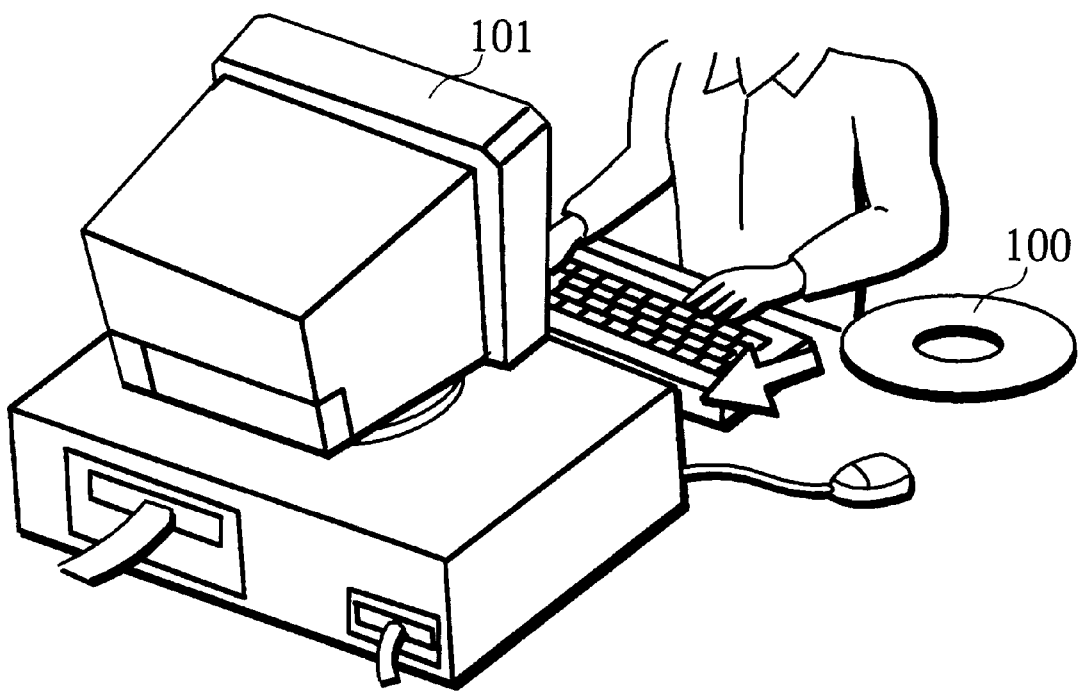
FIG. 6 shows the hardware configuration which is used by the compiler of FIG. 5.

The format by which compilers are conventionally distributed and sold is shown in FIG. 6. Software, which is in text format or executable format and realizes the functions of the compiler, is recorded onto the recording medium 100 and distributed and sold as packaged software. Purchasers of this packaged software install it into the standard computer 101, with the standard computer 101 functioning as a compiler by performing the processing described by the installed software.

When considering this type of compiler, the main focus of the functioning of the compiler is not on hardware resources, such as the CPU and memory provided in the standard computer 101, but on the software recorded on the recording medium. Software which has a complex processing content is usually composed of a plurality of subroutines and work areas, and these separate subroutines and work areas should be considered as separate components. In the following explanation, the subroutines and work areas that are necessary for realizing the optimization apparatus and compiler will be treated as separate components. Note here that it is not necessary to newly develop all of the components of the compiler and the optimization apparatus, with it being normal to make use of other programs and routines registered in the library of the present operating system, or of a present compiler or optimization apparatus. It should be noted here that the details of the components that are realized by conventional subroutines and work areas will be not be given here.

Figure 7:
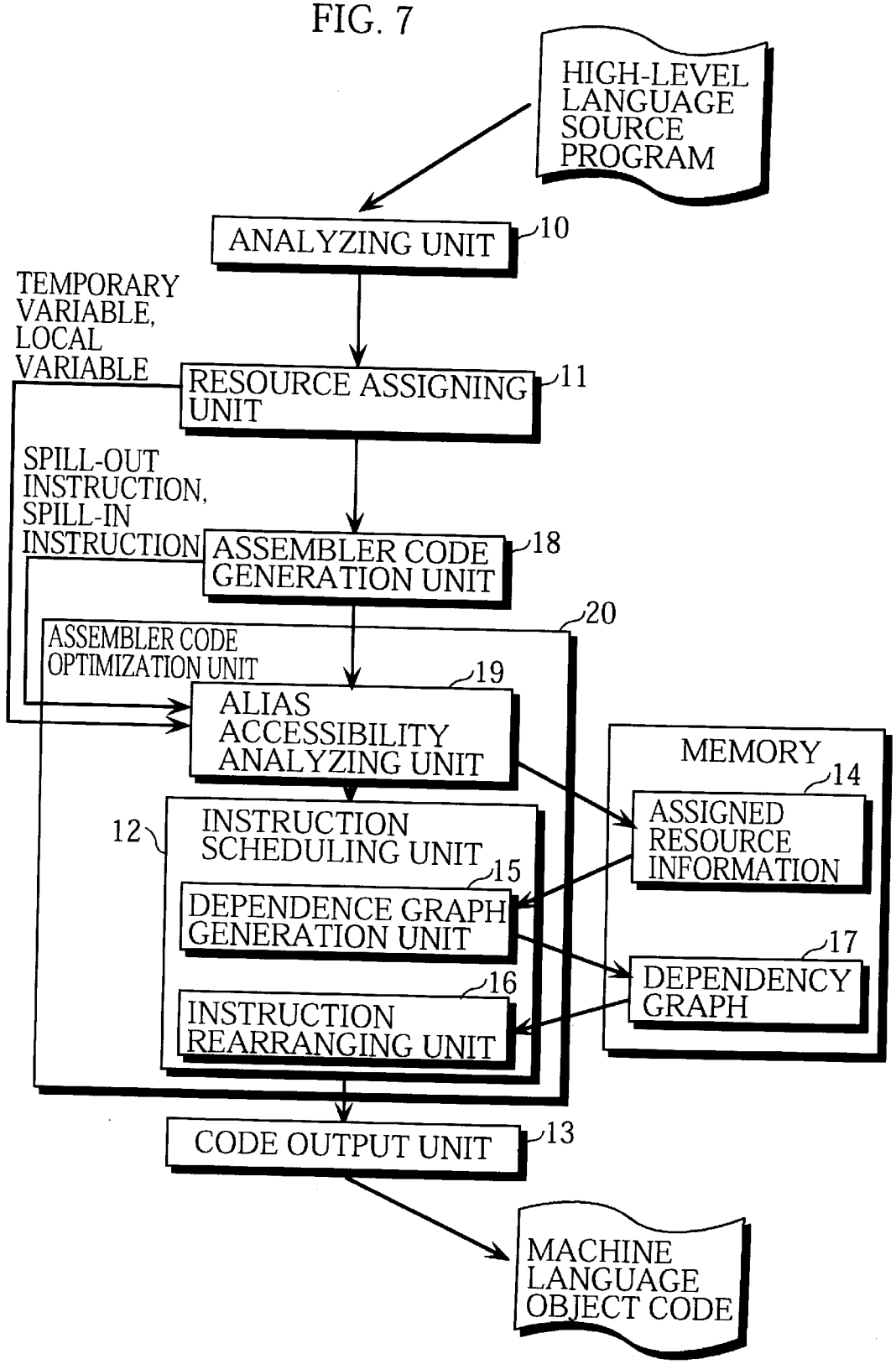
FIG. 7 shows the compiler of the first embodiment of the present invention.

FIG. 7 is a block diagram showing the internal configuration of a compiler. As shown in FIG. 7, this compiler is composed of an analyzing unit 10, a resource assigning unit 11, an assembler code generation unit 18, an assembler code optimization unit 20 and a code output unit 13. Assigned resource information 14 is also stored in the memory. The assembler code optimization unit 20 is an optimization apparatus for optimizing the code at assembler level, and includes an instruction scheduling unit 12 and an alias accessibility analyzing unit 19.

Figures 8A, 8B, 8C, 8D:
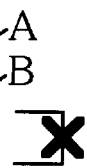
FIG. 8A shows an example of a source program.
FIG. 8B shows of a program that has been converted into intermediate code.
FIG. 8C shows an example result of resource assigning.
FIG. 8D shows an example of an assembler instruction sequence.

The analyzing unit 10 reads a high-level language source program that is stored in file format, and performs syntactic analysis and semantic analysis to convert the source program into internal expressions (hereinafter referred to as "intermediate language" or "intermediate code"). This intermediate language may be subjected to optimization to reduce the execution time and code size of the finally generated object code (which is to say, a separate block called an intermediate code optimization unit is also often provided). The processing of the analyzing unit 10 which generates the intermediate language is not the gist of the present invention, and so will not be described. A source program which is written in high-level language is shown in FIG. 8A, while FIG. 8B shows the intermediate language program that the analyzing unit 10 produces from this source program. For ease of explanation, FIG. 8B onwards only show code that corresponds to the frame marked "a" in FIG. 8A. In this program, the variable k is used as a local variable.

The resource assigning unit 11 determines which machine resources will be assigned the variables in the intermediate language program. When doing so, the resource assigning unit 11 refers to the declarative statements in the program for each variable and gives consideration to whether each variable in the program is a temporary variable, a local variable, or a pointer variable to suitably assign the variables to registers or memory. When doing so, the resource assigning unit 11 assigns temporary variables and local variables to the data registers or the stack region in the memory, and assigns pointer variables to address registers. The resource assigning unit 11 also determines the priority of each variable based on the length of the live range of the variable and the frequency with which it is used, and assigns variables with high priorities to the registers and variables with low priorities to the memory. The result of resource assigning by the resource assigning unit 11 is shown in FIG. 8C. Of the variables shown in FIG. 8B, in the present example the variable i is assigned to the register D0, the variable j is assigned to the register D1, and the variable k is assigned to the memory (SP,0).

The assembler code generation unit 18 refers to the resource assigning result of the resource assigning unit 11 and generates assembler instructions from the intermediate language program. When an arithmetic instruction has been generated and it is necessary to temporarily save a numerical value that was stored in a register, the assembler code generation unit 18 generates a spill-out instruction and a spill-in instruction.

The assembler instructions generated by the assembler code generation unit 18 from the intermediate language instructions shown in FIG. 8B are shown in FIG. 8D. It should be noted in FIG. 8D that there are insufficient registers where the operation "k=k+1" is performed, so that the spill-out code "mov D1, (SP,4)" for saving the value of the register D1 into the memory (SP,4) is generated, and when the operation has been completed, the spill-in code "mov (SP,4),D1" which returns the value from the memory (SP,4) to the register D1 is generated.

The alias accessibility analyzing unit 19 analyzes whether access by alias is possible within the assembler instruction sequence generated by the assembler code generation unit 18.

To determine whether access by alias is possible, the present apparatus judges whether it is possible for a user program to operate an access target of a memory access instruction. Memory access instructions with an access target that cannot be operated by a user program are instructions where the access target corresponds to a temporary variable, spill-in and spill-out instructions, and instructions corresponding to local variables where it is certain that the storage address is not referred to.

The possibility for access by alias means that the access target may be operated by a user program, so that access by alias is judged as not being possible for the types of instructions mentioned above.

When a spill-out instruction and a spill-in instruction have been generated, the alias accessibility analyzing unit 19 stores the line numbers of the lines where the spill-out instruction and spill-in instruction are located and an addressing code showing the access targets of these instructions in the assigned resource information 14. Instructions where the line numbers and addressing codes are stored in this way are interpreted as having no possibility for access by alias.

The alias accessibility analyzing unit 19 uses the result of the classification of the variables performed during resource assigning by the resource assigning unit 11 to grasp the relationship between variables and access targets.

When determining that an instruction is a memory access instruction where the access target corresponds to a temporary variable, or a memory access instruction where the access target corresponds to a local variable that is not subjected to address referencing, the alias accessibility analyzing unit 19 stores the line number of the memory access instruction and the addressing code that shows the access target in the assigned resource information 14. Instructions where the line numbers and addressing codes are stored in this way are interpreted as having no possibility for access by alias. In the present embodiment, the line number of a memory access instruction and an addressing code showing the access target are stored in the assigned resource information 14 to mark the instructions where access by alias is possible.

The following is a description, with reference to FIG. 9A, of the processing of the alias accessibility analyzing unit 19 when the assembler instructions shown in FIG. 8D have been generated.

Since the access target of the arithmetic instruction "add 1,D0" on the first line is a register, the alias accessibility analyzing unit 19 judges that there is no possibility for access by alias for the present instruction.

The access target of the memory access instruction "mov D0,(A0)" on the second line is a memory address which is specified according to indirect addressing, so that the alias accessibility analyzing unit 19 judges that access by alias is possible for this instruction.

The memory access instruction "mov D1,(SP,4)" on the third line is a memory access instruction which defines the value of the memory address (SP,4), making it a spill-out instruction. The alias accessibility analyzing unit 19 judges that access by alias is not possible for this instruction and so writes the line number of this memory access instruction "mov D1,(SP,4)" into the assigned resource information 14 so as to have the assigned resource information 14 show that access by alias is not possible for the memory access instruction "mov D1,(SP,4)".

The memory access instruction "mov (SP,0),D1" on the fourth line is a memory access instruction which transfers a stored value from the memory address (SP,0) to the data register D1. The alias accessibility analyzing unit 19 judges what kind of variable corresponds to the address (SP,0). From the resource assigning results shown in FIG. 8C, it can be seen that the address (SP,0) corresponds to the temporary variable k.

Since the access target of the instruction is a memory address that corresponds to a temporary variable, the alias accessibility analyzing unit 19 judges that access by alias is not possible for the memory access instruction "mov (SP,0),D1", and so registers the line number of this instruction in the assigned resource information 14. By doing so, the alias accessibility analyzing unit 19 has the assigned resource information 14 show that access by alias is not possible for the memory access instruction "mov (SP,0), D1".

The arithmetic instruction "add D1,D1" on the fifth line performs an arithmetic operation using a register, so that the alias accessibility analyzing unit 19 does not judge whether access by alias is possible.

The memory access instruction "mov D1,(SP,0)" is a memory access instruction that transfers a stored value from the data register D1 to the memory address (SP,0). As can be seen from the resource assigning results in FIG. 8C, the memory address (SP,0) corresponds to the temporary variable k, so that the alias accessibility analyzing unit 19 judges that there is no possibility for access by alias for the memory access instruction "mov D1,(SP,0)". As a result, the alias accessibility analyzing unit 19 stores the line number of this instruction in the assigned resource information 14 to have the assigned resource information 14 reflect that access by alias is not possible for the memory access instruction "mov D1, (SP,0)".

The memory access instruction "mov (SP,4),D1" on the seventh line is a memory access instruction that refers to the memory address (SP,4). This is a spill-in instruction, so that the alias accessibility analyzing unit 19 judges that there is no possibility for access by alias and stores the line number of the memory access instruction "mov (SP,4),D1" in the assigned resource information 14. In this way, the alias accessibility analyzing unit 19 has the assigned resource information 14 reflect that access by alias is not possible for the memory access instruction "mov (SP,4),D1". The results of the analysis into whether access by alias is possible for each line are shown in FIG. 9A.

The following is a description of the internal configuration of the instruction scheduling unit 12. The instruction scheduling unit 12 is composed of a dependence graph generation unit 15 and an instruction rearranging unit 16.

The dependence graph generation unit 15 is activated after assembler instructions have been generated by the assembler code generation unit 18, and converts the assembler instructions into a dependence graph by forming directed links between them.

It should be noted here that while it is also necessary to form directed links showing dependency with instructions outside the basic block of an instruction, such links have been omitted to simplify the explanation. Dependency with instructions that lie outside the basic block can be easily analyzed by setting a virtual basic block starting instruction and virtual basic block ending instruction, for example.

Figure 11:
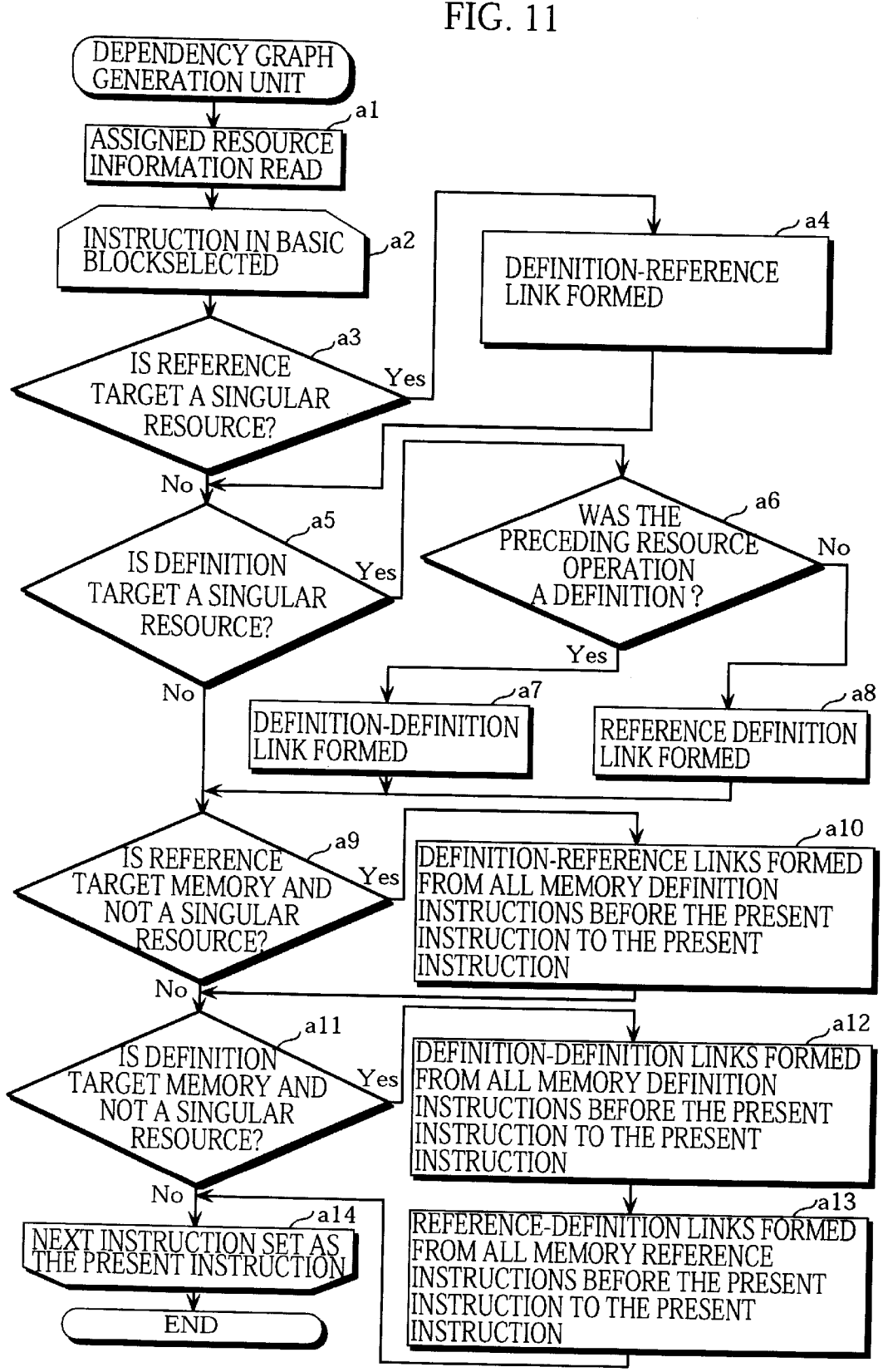
FIG. 11 is a flowchart showing the processing of the dependency graph generation unit in the first embodiment.

A flowchart showing the processing of the dependence graph generation unit 15 is shown in FIG. 11.

In step a1, the dependence graph generation unit 15 fetches the assigned resource information 14 generated by the assembler code generation unit 18.

In step a2, the dependence graph generation unit 15 fetches an instruction in a basic block and set this as the instruction to be processed. This fetched instruction is hereafter referred to as the "present instruction".

In step a3, the dependence graph generation unit 15 judges whether the instruction only refers to a singular resource. Here, the judgement as to whether the instruction refers to a "singular resource" refers to whether the access target of the present instruction is clearly specified, which is to say that access by alias is not possible for the instruction. If the instruction only refers to a singular resource, the processing proceeds to a4.

When access by alias is not possible, there is definitely no change in the stack pointer, and the present instruction has an access target that is specified by the stack pointer and a relative address expressed as an offset from the stored value of the stack pointer, the memory address which is the access target is clearly specified, so that the access target of the present instruction is judged as being a singular resource.

In step a4, an instruction which defines the reference target of the present instruction is detected out of the instructions located before the present instruction. The dependence graph generation unit 15 then forms a directed link between the detected instruction and the present instruction. The directed link formed in this way is a definition-reference link where the present instruction is located on the reference side. When the instruction that defines the reference target resource of the present instruction is not located in the same basic block (which is to say, the reference target resource is defined outside the basic block), the dependence graph generation unit 15 forms a virtual link to the virtual basic block starting instruction. This is also the case for the following linking processes.

In step a5, the dependence graph generation unit 15 judges whether the definition target of the present instruction is a singular resource. If so, the processing advances to step a6.

In step a6, the dependence graph generation unit 15 detects an instruction, out of the preceding instructions which operate the singular resource that is the definition target of the present instruction, that is located closest to the present instruction. The dependence graph generation unit 15 then judges whether the definition target of the detected instruction is the same as the singular resource.

If so, the processing advances to step a7, or if not, the processing advances to step a8.

In step a7, the dependence graph generation unit 15 forms a link between the detected instruction and the present instruction. The directed link formed in this way is a definition-definition link where the present instruction is the link destination.

In step a8, the dependence graph generation unit 15 detects every instruction, between the present instruction and the closest instruction that defines the same resource as present instruction, which has the resource defined by the present instruction as its reference target. The dependence graph generation unit 15 then forms links between the detected instructions and the present instruction. The directed links formed in this way are reference-definition links that have the present instruction on the definition side.

By performing the processing in steps a3 to a8, the dependence graph generation unit 15 forms definition-reference links with the present instruction on the reference side, as well as definition-definition links and reference-definition links with the present instruction on the (latter) definition side.

The links formed in steps a3 to a8 are directed links with a singular resource included in the present instruction as a base point. Directed links which have other resources (memory addresses indicated by indirect addressing and memory addresses for which access by alias is possible) are generated by the processing in steps a9 to a13.

In step a9, the dependence graph generation unit 15 judges whether the memory reference performed by the present instruction is a memory reference that may be performed using an alias. If so, the processing advances to step a10.

In step a10, all memory definition instructions positioned before the present instruction, aside from memory access instructions whose line numbers have been written in the assigned resource information, are detected and a separate definition-reference link is formed from each detected memory definition instruction to the present instruction. The assigned resource information 14 is fetched in step a1, and is modified by the alias accessibility analyzing unit 19 to show instructions where there is no possibility of access by alias.

By performing step a10, the dependence graph generation unit 15 forms directed links for instructions, out of memory access instructions where there is the possibility of access by alias and memory definition instructions where there is a possibility of a definition-reference dependency, provided such instructions do not relate to temporary variables or local variables that are subjected to address referencing, and provided such instructions are not a spill-out or spill-in instruction.

In step a11, the dependence graph generation unit 15 judges whether the present instruction is a memory access instruction for which access by alias is possible. If so, the processing advances to step a12.

In step a12, the dependence graph generation unit 15 detects all memory definition instructions that are positioned before the present instruction but which are not memory access instructions whose line numbers are written in the assigned resource information 14. The dependence graph generation unit 15 then forms a separate definition-definition link from each detected instruction to the present instruction.

In step a13, the dependence graph generation unit 15 detects every memory reference instruction that is positioned before the present instruction aside from memory access instructions whose line number is registered in the assigned resource information 14. The dependence graph generation unit 15 forms a separate reference-definition link from each of the detected memory reference instructions to the present instruction.

The dependence graph composed of the directed links formed in the processing in steps a1 to a13 has very few directed links before or after memory access instructions.

Figures 10A, 10B:
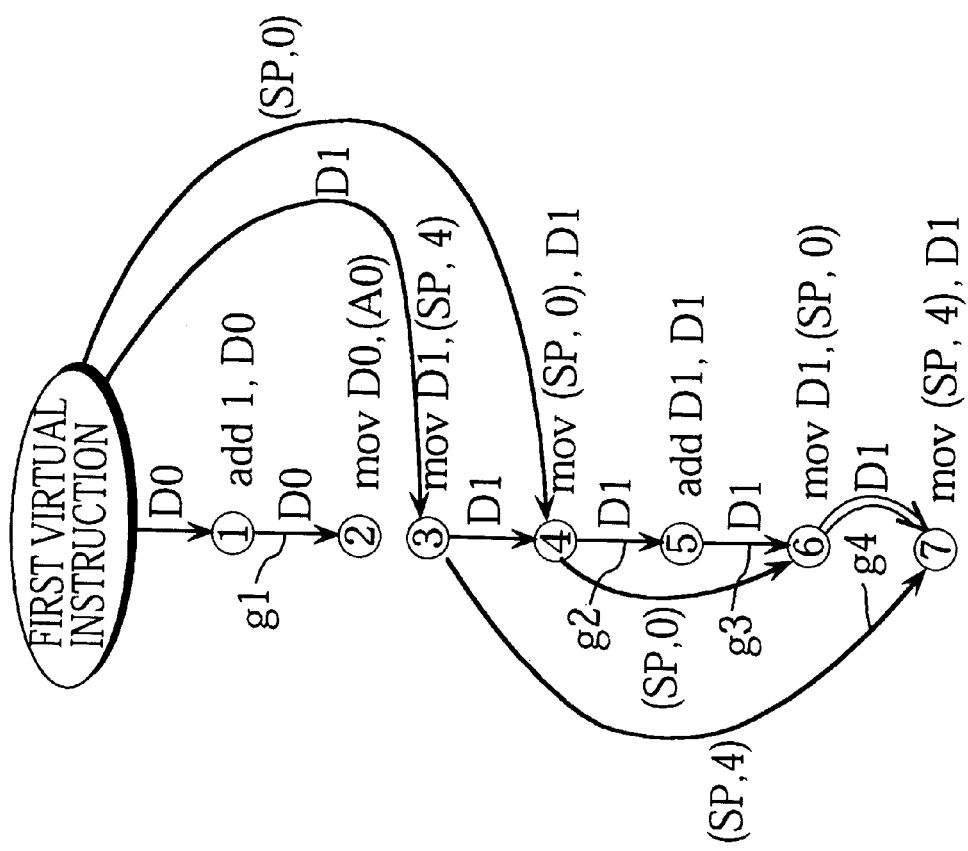
FIG. 10A shows an example of the dependence graph generated from the assembler instructions shown in FIG. 8D.
FIG. 10B shows an example scheduling result when using the dependence graph shown in FIG. 10A.

The following is a more detailed explanation of the formation of directed links with reference to the flowchart in FIG. 11. Here, FIG. 10A shows the directed links that are formed when the processing in FIG. 11 is performed for the assembler instructions shown in FIG. 8A.

When the present instruction is the arithmetic instruction "add 1,D0" on the first line, a virtual basic block starting instruction is generated to show that this is the start of a basic block, and a directed link is formed from this virtual basic block starting instruction to the arithmetic instruction "add 1,D0".

When the present instruction is the memory access instruction "mov D0,(A0)" on the second line, the dependence graph generation unit 15 detects the arithmetic instruction "add 1,D0" as the definition instruction for the data register D0 that is the reference target resource of the present instruction. Accordingly, the dependence graph generation unit 15 forms the definition-reference link g1 from the detected arithmetic instruction "add 1,D0" to the present memory access instruction "mov D0,(A0)" and a directed link from the virtual basic block starting instruction to the present memory access instruction "mov D0,(A0)".

When the present instruction is the memory access instruction "mov D1,(SP,4)" on the third line, there is no instruction defining the value of the data register D1, which is the reference resource of the present instruction, located the present basic block. As a result, the dependence graph generation unit 15 forms a directed link from the virtual basic block starting instruction to the present memory access instruction "mov D1,(SP,4)".

When the present instruction is the memory access instruction "mov (SP,0),D1" on the fourth line, there is no instruction defining the value of the memory address (SP,0), which is the reference resource of the present instruction, located the present basic block. As a result, the dependence graph generation unit 15 forms a directed link from the virtual basic block starting instruction to the present memory access instruction "mov (SP,0),D1".

When the present instruction is the arithmetic instruction "add D1,D1" on the fifth line, the dependence graph generation unit 15 detects the memory access instruction "mov (SP,0),D1" as the instruction which defines the reference resource of the present instruction. Accordingly, the dependence graph generation unit 15 forms the definition-reference link g2 from the detected memory access instruction "mov (SP,0),D1" to the present instruction.

When the present instruction is the memory access instruction "mov D1,(SP,0)" on the sixth line, the dependence graph generation unit 15 detects the arithmetic instruction "add D1,D1" as the definition instruction for the reference resource of the present instruction. Accordingly, the dependence graph generation unit 15 forms the definition-reference link g3 from the detected arithmetic instruction "add D1,D1" to the present instruction.

When the present instruction is the memory access instruction "mov (SP,4),D1" on the seventh line, the dependence graph generation unit 15 detects the memory access instruction "mov D1,(SP,4)" on the third line as the definition instruction for the reference resource of the present instruction. Accordingly, the dependence graph generation unit 15 forms the definition-reference link g4 from the memory access instruction "mov D1,(SP,4)" on the third line to the present instruction. As for the definition resource, data register D1, the dependence graph generation unit 15 forms a reference-definition link from the memory access instruction "mov D1,(SP,0)" on the preceding line.

On receiving the dependency graph 17 from the dependence graph generation unit 15, the instruction scheduling unit 12 rearranges the instructions to reduce the execution time of the instruction sequence. When it is supposed that the target machine has a five-stage pipeline architecture composed of IF, DEC, EX, MEM, and WB stages, reductions in the execution time can be achieved by separating load instructions from arithmetic instructions that perform calculations using to the loaded values.

The dependency graph 17 provided to the instruction scheduling unit 12 includes very few directed links before and after memory access instructions where indirect addressing is used, so that the rearranging of instructions can be performed with a high degree of freedom. As a result, there is a high probability that load instructions will be separated from arithmetic instructions. In the assembler program shown in FIG. 8D, the memory access instruction "mov (SP,0),D1" on the fourth line loads the stored value of the address (SP,0) into the data register D1, with the following instruction "add D1,D1" performing a calculation which refers to the loaded value. The instruction scheduling unit 12 performs scheduling to separate these instructions on the fourth and fifth lines, and changes the order of the instructions to that shown in FIG. 10B. In the instruction sequence shown in FIG. 10B, the arithmetic instruction "add 1,D0" and the memory access instruction "mov D0,(SP,4)" are inserted between the memory access instruction "mov (SP,0),D1" and the arithmetic instruction "add D1,D1" to separate the load instruction and the arithmetic instruction that performs a calculation using the loaded value. As a result, the two instruction pattern that causes difficulties in five-stage pipeline architecture is resolved, making the five-stage pipeline operate smoothly.

The code output unit 13 receives the rearranged instruction sequence from the instruction scheduling unit 12 and outputs a file or the like with the received instruction sequence as a machine language program or assembler program.

With the present embodiment, even if a memory access instruction is positioned before or after a memory access instruction that uses indirect addressing, if the access target of this instruction is a local variable that is not subjected to address referencing, a temporary variable, or a resource related to a spill destination, the instruction scheduling unit 12 is informed that there is no possibility of access by alias. On being thus informed, the instruction scheduling unit 12 rearranges the order of the instructions, even when a memory access instruction is positioned before or after a memory access instruction that uses indirect addressing, so as to improve the relationship between these instructions. This rearranging is unrestricted by the positional relationship of instructions before or after a memory access instruction that uses indirect addressing, and so can be performed with a high degree of freedom. As a result, delays in the pipeline can be resolved.

It should be noted that in the present embodiment, the internal configuration of the compiler is such that the alias accessibility analyzing unit 19 transfers the assigned resource information 14 to the instruction scheduling unit 12. The instruction scheduling unit 12 may however be separated from the compiler, with assigned resource information being added to the assembler instructions or machine language instructions outputted from the compiler. These may then be analyzed by the optimization unit which performs scheduling for the assembler instructions or machine language instructions. This improves the efficiency with which instruction scheduling is performed.

In FIG. 7, the assembler code optimization unit 20 and the alias accessibility analyzing unit 19 are shown as coming after the analyzing unit 10, the resource assigning unit 11, and the assembler code generation unit 18, with the instruction scheduling unit 12 receiving the information required for optimization from the alias accessibility analyzing unit 19 via the assigned resource information 14 in the memory. However, a construction (which is to say, a program) aside from the analyzing unit 10-resource assigning unit 11-assembler code generation unit 18-alias accessibility analyzing unit 19-instruction scheduling unit 12 configuration may be used. When doing so, the assigned resource information 14 may be transferred from the alias accessibility analyzing unit 19 to the instruction scheduling unit 12 as outputted assembler code. Here, the assigned resource information 14 is recorded in a different information region in the assembler code to the instruction sequence. The assigned resource information 14 may alternatively be transferred as comments that are appended to corresponding assembler instructions, or as false instructions that are mixed in with the assembler instructions.

The assembler code outputted in such a case may be used having been recorded on a separate recording medium within the assigned resource information 14.

Second Embodiment

The second embodiment of the present invention is constructed to delete redundant transfer instructions.

Figure 12:
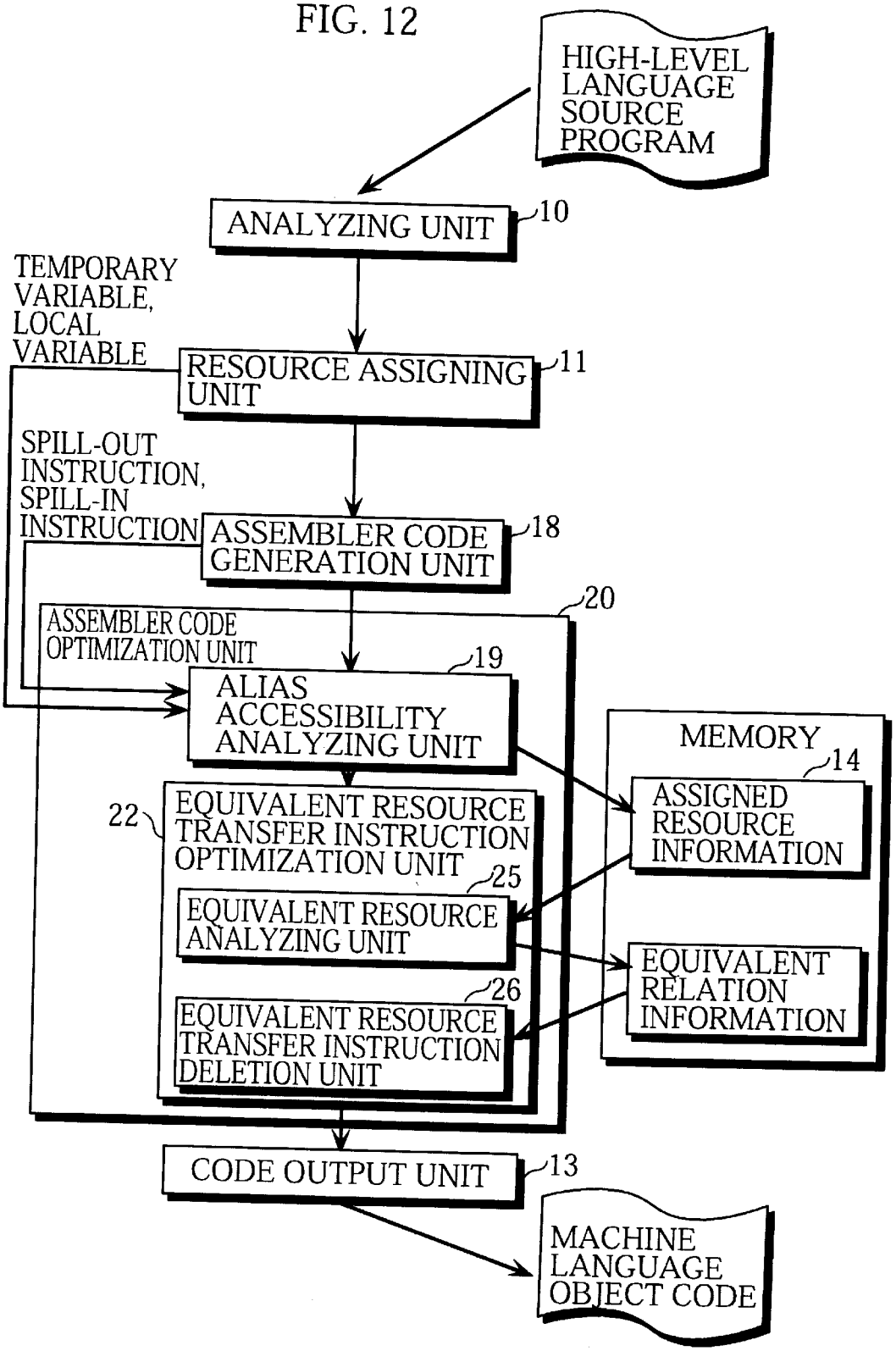
FIG. 12 shows the construction of the compiler of the second embodiment.

FIG. 12 is a block diagram showing the internal configuration of the compiler of the second embodiment. The configuration of this compiler differs from that in the first embodiment in that the instruction scheduling unit 12 provided in the assembler code optimization unit 20 has been replaced with the equivalent resource transfer instruction optimization unit 22.

The equivalent resource transfer instruction optimization unit 22 is composed of an equivalent resource analyzing unit 25 and an equivalent resource transfer instruction deleting unit 26.

Figure 17:
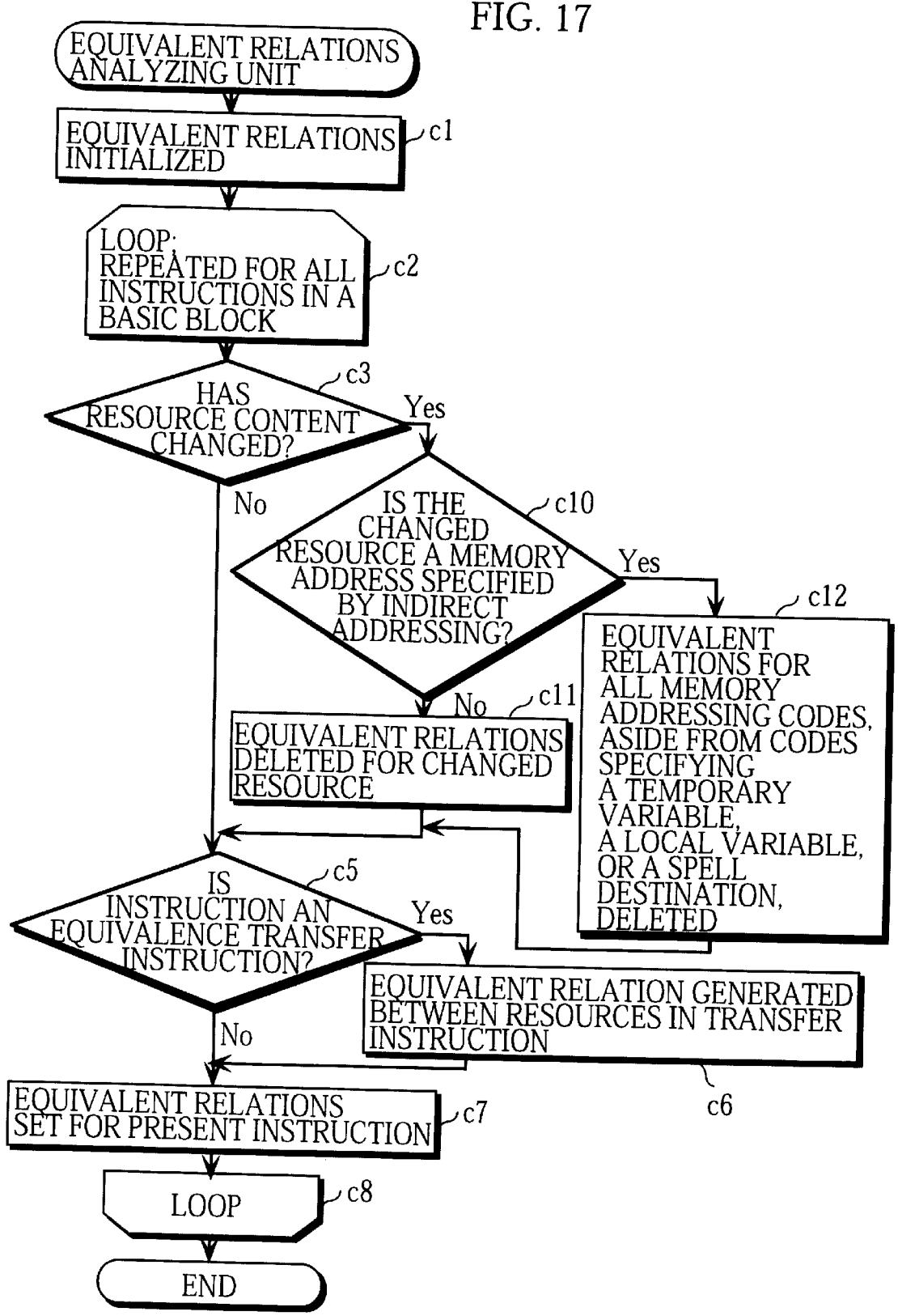
FIG. 17 is a flowchart for the process generating equivalence groups.

The equivalent resource analyzing unit 25 generates equivalence groups for the instructions within basic blocks, out of the instruction sequences outputted by the resource assigning unit 21. A flowchart for the processing that generates equivalence groups is shown in FIG. 17.

In step c1, the equivalent resource analyzing unit 25 clears the equivalence information for each instruction in a basic block and the present equivalent relations.

In step c2, the equivalent resource analyzing unit 25 selects one instruction in a basic block in order, this instruction hereafter being referred to as the "present instruction". This instruction is subjected to the loop processing in steps c3 to c7.

In step c3, the equivalent resource analyzing unit 25 determines whether the present instruction changes the value of a resource. If so, the processing advances to step c10.

In step c10, the equivalent resource analyzing unit 25 judges whether the changed resource is a memory address that is specified using indirect addressing. If not, the processing advances to step c11 where the equivalent relations are deleted for the changed resource.

If the changed resource is a memory address indicated by indirect addressing, addressing codes that show the addresses of all memory access instructions are deleted, with the exception of those for temporary variables, for local variables that are not subjected to address referencing, and for spill destinations.

The following is a supplementary explanation for the inter-register equivalent relations clearing procedure in step c10 to step c12. As one example, suppose that the equivalent relation {D0,D1} is established just before the arithmetic instruction "add 1,D0" is executed. This means that the stored value of the register D0 equals the stored value of the register D1 at that point. While the stated equivalent relation is established before the execution of this arithmetic instruction, the instruction performs an arithmetic operation that changes the stored value of the data register D0. As a result, once this instruction has been performed, the value of the data register will have changed, so that the equivalent relation {(D0,D1} is regarded as having been destroyed by this instruction. Consequently, the equivalent relations for the data register D0 are cleared.

In the same way, the equivalent relations {D0,D1,D2} are established before the arithmetic instruction "add 1,D0" is executed. While these equivalent relations are established before the arithmetic instruction "add 1,D0", this instruction performs an arithmetic operation which changes the value of the data register D0. As a result, the data register D0 ends up storing a different value to the data register D1 and the data register D2, so that the equivalent relation {D0,D1,D2} is regarded as having been destroyed by this instruction. Consequently, the equivalent relations for the data register D0 are cleared.

Next, suppose that a memory access instruction has been cleared. The clearing of a memory access instruction may be performed for the same reasons as for a clearing of registers, although for memory resources, there are cases where the memory resource is specified by a definition instruction that uses indirect addressing. In the present flowchart, step c10 and c11 are provided for instructions where memory addressing is performed by definition instructions in indirect addressing format.

Steps c10 and c11 define how the equivalent relations should be cleared when the definition target of the present instruction is specified using indirect addressing. Instructions where the definition target is specified using indirect addressing clearly change the value of a resource, so that the judgement "Yes" is given in step c3, but since the definition target is expressed in a definition instruction that uses indirect addressing, it is impossible to determine from the code which address has the value which will be changed. Consequently, there is the possibility that this indirect addressing will specify a same resource as a memory address for which an equivalent relation has been established. However, even if the memory address is a memory address for which an equivalent relation was established prior to the memory access instruction that uses indirect addressing, there is no chance that the memory access instruction that uses indirect addressing will specify a same resource as an address corresponding to a temporary variable, a local variable that is not subjected to address referencing, or a same resource as a spill-out or spill-in instruction. Accordingly, in step c12, the access targets of spill-out and spill-in instructions and memory addresses that correspond to temporary variables or local variables which are not subjected to address referencing are treated as being memory addresses whose equivalent relations are not to be deleted. As a result, equivalent relations are only cleared for the memory addresses for memory addresses that have an actual probability of being accessed by the definition instruction that uses indirect addressing.

By operating as described above, the problem of having to delete all memory operation codes before and after a memory access instruction that uses indirect addressing can be avoided.

In step c5, the equivalent resource analyzing unit 25 judges whether the present instruction is an equivalence transfer instruction. If so, the processing advances to step c6. The expression "equivalence transfer instruction" here refers to a transfer instruction where the transfer source and transfer destination have the same code and same data size.

In step c6, the equivalent resource analyzing unit 25 generates equivalent relations corresponding to the equivalence transfer instruction, and expresses the equivalent relations as equivalence groups.

In step c7, the present equivalent relations are set as the equivalent relations for the present instruction. As one example, when the present instruction is "mov D0,D1", the equivalent relation {D0,D1} is generated.

The equivalent resource transfer instruction deleting unit 26 receives the equivalent relations from the equivalent resource analyzing unit 25 and deletes redundant transfer instructions. The equivalent relations include a group of addressing codes, and show which resources have a same value as each other before or after the execution of each instruction. As one example, if there is a transfer instruction that transfers a value from resource B to resource A and the equivalent relations show that resources A and B have the same value before the execution of this instruction, the transfer instruction can be seen to be redundant and so does not need to be executed. This kind of redundant instruction is deleted by the equivalent resource transfer instruction deleting unit 26.

The following is a description of the processing of the equivalent resource transfer instruction optimization unit 22 whereby equivalent relations are generated and used in the deletion of redundant transfer instructions.

FIG. 13A shows an example of a high-level language source program, while FIG. 13B shows the results of resource assigning by the resource assigning unit 11. In the example shown in FIG. 13B, variable i is assigned the register D0 while variable j is assigned the memory address (SP,4). Variable p is assigned the address register A0. These assigning results are then used by the assembler code generation unit 18 to generate the assembler program shown in FIG. 13C.

After generating the assembler program shown in FIG. 13C, the assembler code generation unit 18 analyzes whether access by alias is possible for each assembler instruction in the assembler program. The results of this analysis are shown in FIG. 14A.

The memory access instruction "mov (SP,4),D1" on the first line is a memory access instruction that transfers a stored value from the memory address (SP,4) to the data register D1. In this case, the assembler code generation unit 18 analyzes which variable corresponds to the address (SP,4). As can be seen from the resource assigning results shown in FIG. 13B, the memory address (SP,4) is assigned to the local variable j which is not subjected to address referencing.

Since the reference target is a memory address corresponding to a local variable that is not subjected to address referencing, the assembler code generation unit 18 interprets that there is no possibility of access by alias for the memory access instruction "mov (SP,4),D1" and so registers the line number of the memory access instruction "mov (SP,4),D1" in the assigned resource information 14 to have the assigned resource information 14 reflect that there is no possibility of access by alias for the memory access instruction "mov (SP,4),D1".

The arithmetic instruction "sub 1,D1" on the second line is an arithmetic instruction which performs a subtraction using a register, so that the assembler code generation unit 18 concludes that there is no possibility of access by alias for this instruction.

The memory access instruction "mov D1,(SP,4)" on the third line is a memory access instruction that transfers a stored value from the data register D1 to the memory address (SP,4). As can be seen from the resource assigning results shown in FIG. 13B, the memory address (SP,4) is assigned to the local variable j which is not subjected to address referencing. Since the reference target is a memory address corresponding to a local variable that is not subjected to address referencing, the assembler code generation unit 18 interprets that there is no possibility of access by alias for the memory access instruction "mov D1,(SP,4)" and so registers the line number of the memory access instruction "mov D1,(SP,4)" in the assigned resource information 14 to have the assigned resource information 14 reflect that there is no possibility of access by alias for the memory access instruction "mov D1,(SP,4)".

The access target of the memory access instruction "mov D0,(A0)" on the fourth line is a register, with a memory address being indicated by indirect addressing. Accordingly, the assembler code generation unit 18 interprets that access by alias is possible for this instruction.

The memory access instruction "mov (SP,4),D1" on the fifth line is a memory access instruction that transfers a stored value from the memory address (SP,4) to the data register D1. In this case, the assembler code generation unit 18 analyzes which variable corresponds to the address (SP,4). As can be seen from the resource assigning results shown in FIG. 13B, the memory address (SP,4) is assigned to the local variable j which is not subjected to address referencing.

Since the reference target is a memory address corresponding to a local variable that is not subjected to address referencing, the assembler code generation unit 18 interprets that there is no possibility of access by alias for the memory access instruction "mov (SP,4),D1" and so registers the line number of the memory access instruction "mov (SP,4),D1" in the assigned resource information 14 to have the assigned resource information 14 reflect that there is no possibility of access by alias for the memory access instruction "mov (SP,4),D1".

The arithmetic instruction "add D1,D0" on the sixth line performs a subtraction using the values of the data register D1 and the data register D0, so that the assembler code generation unit 18 interprets that there is no possibility of access by alias for this instruction.

FIG. 14B shows the assigned resource information 14 after the line numbers of memory access instruction "mov (SP,4),D1", memory access instruction "mov D1,(SP,4)", and memory access instruction "mov (SP,4),D1" have been registered. As shown in FIG. 14B, the assembler instructions on the first, third, and fifth lines are interpreted as having no possibility of access by alias. It can also be seen that the address (SP,4) has been registered as the access target of memory access instructions that have been generated for local variables.

Once the assembler code generation unit 18 has analyzed whether access by alias is possible for each instruction in the assembler program, the equivalent resource analyzing unit 25 generates equivalence groups for each instruction.

When the present instruction is the memory access instruction "mov (SP,4),D1" on the first line, the equivalent resource analyzing unit 25 forms the equivalent relation {(SP,4),D1} between the memory address (SP,4) and the data register D1.

When the present instruction is the subtraction instruction "sub 1,D1" on the second line, this instruction will change the value of the data register D1, so that the judgement "Yes" is given in step c3 and the processing advances to steps c10 and c11. In step c11, the data register D1, which is the defined resource of the present instruction, is deleted from the equivalence group {(SP,4),D 1}, making the equivalence group the empty set { }.

When the present instruction is the memory access instruction "mov D1,(SP,4)" on the third line, the stored value of the memory address (SP,4) will change, so that the judgement "Yes" is given in step c3 and the processing advances to steps c10 and c11. While the equivalence group for the data register D1 was deleted in the previous execution of step c11 and so is the empty set { }, in step c6 the equivalent resource analyzing unit 25 forms the equivalent relation {(SP,4),D1} between the memory address (SP,4) and the data register D1.

When the present instruction is the memory access instruction "mov D1,(A0)" on the fourth line, this instruction will change the value of the address register A0. As a result, the judgement "Yes" is given in step c3 and the processing advances to step c10. Since the memory access instruction "mov D1,(A0)" is a definition instruction that uses indirect addressing, the judgement "Yes" is given in step c10, and the processing advances to step c12. In step c12, the addressing codes showing equivalent relations would conventionally be deleted, but since the address (SP,4) for which the equivalent relation is set represents a local variable that is not subjected to address referencing, deletion is avoided. As a result, the equivalent relation {(SP,4),D1} between the data register D1 and the memory address (SP,4) is maintained beyond the memory access instruction which uses indirect addressing.

When the present instruction is the memory access instruction "mov (SP,4),D1" on the fifth line, the equivalent relation {(SP,4),D1} is generated between the address (SP,4) and the data register D1 in step c6.

When the present instruction is the subtraction instruction "add D1,D0" on the sixth line, the value of the data register D0 is changed, so that the judgement "Yes" is given in step c3 and the processing advances to steps c10 and c11. In step c11, the equivalent relations that feature the data register D0 are to be changed, though since such relations are not present, the equivalence groups remain unchanged at {(SP,4),D1}.

FIG. 15 shows the equivalence groups that are generated for each instruction between the memory access instruction "mov (SP,4),D1" and the arithmetic instruction "add D1,D0". Once equivalence groups have been generated for every instruction, the equivalent resource transfer instruction deleting unit 26 detects and deletes instructions which perform a transfer in spite of the resources involved in the transfer having an equivalent relation following the execution of the immediately preceding instruction. As can be seen from the results of the analysis of the equivalence groups in FIG. 15, the transfer instruction "mov (SP,4),D1" on the fifth line transfers a stored value from the memory address (SP,4) to the data register D1 in spite of these resources already having an equivalent relation. On detecting such redundant instructions, the equivalent resource transfer instruction deleting unit 26 deletes them, which in the present example results in the program shown in FIG. 16.

In the present embodiment described above, when the equivalence groups are analyzed for each instruction in a basic block, the addressing codes included in the equivalence groups that correspond to temporary variables or local variables that are not subjected to address referencing, or that indicate a storage address in the stack are not deleted and so are carried over beyond memory access instructions that use indirect addressing. By carrying over equivalent relations in this way, a greater number of redundant transfer instructions that are positioned after memory access instructions which use indirect addressing can be deleted.

By detecting and deleting a larger number of redundant instructions in this way, improvements can be made in the execution time and program size of the finally outputted program.

It should be noted here that in the second embodiment, optimization may be achieved through copy propagation instead of the deletion of redundant transfer instruction. When doing so, the equivalent resource analyzing unit 25 generates equivalence groups, composed of all of the addressing codes specifying the access targets of the detected register access instructions and memory access instructions, for a memory access instruction that uses indirect addressing. After generating such groups, transfer instructions are extracted from the assembler program as processed instructions, and transfer instructions whose defined resource is the reference resource of one of these processed instructions are detected.

Addressing codes in the equivalence groups which have no possibility of access by alias are deleted, and after deleting these codes, the equivalent resource analyzing unit judges whether reference resource of each processed instruction may be replaced with the reference resource of one of the detected transfer instructions. If so, the equivalent resource analyzing unit 25 replaces the reference resource of a processed instruction with the reference resource of a detected transfer instruction and, having done so, deletes the transfer instruction in question.

The second embodiment may also perform operand replacement. When doing so, it is judged whether each operand can be replaced based on the equivalence groups after the resource codes have been deleted. Operands are then replaced when replacement is judged as possible and as causing a reduction in code size and/or execution time.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. An optimizing apparatus for optimizing a sequence of instructions obtained as a result of a compiler translating a source program composed of statements written in a programming language, wherein the compiler includes resource assigning means for assigning a plurality of resources to a plurality of variables included in the statements of the source program, and classifying the plurality of variables into different types; and instruction generating means for generating a sequence of instructions based on the source program, and classifying the instructions of the generated sequence into a type which corresponds to any of the statements in the source program and a type which does not correspond to any of the statements in the source program, the optimizing apparatus comprising:

extracting means for extracting memory access instructions from the sequence of instructions which specify a memory address as an access target;

judging means for judging, each extracted memory access instruction, to determine whether the memory address specified as an access target by the memory access instruction corresponds to a variable which is accessed by an operation involving another variable in the source program, in accordance with the classification results of the resource assigning means and the instruction generating means;

appending means for adding a mark, showing that there is no possibility of access by alias, to each extracted memory access instruction whose access target is judged as not being accessed by an operation involving another variable; and optimizing means for referring to the marks appended by the appending means and optimizing the sequence of instructions.

2. The optimizing apparatus of claim 1, wherein one of the types for classifying the plurality of variables by the resource assigning means is a local variable that is not subjected to address referencing in the source program;

the judging means includes a first judging unit for judging whether the access target of the memory access instruction corresponds to a local variable, in accordance with the classification results of the resource assigning means; and the appending means adds a mark showing that there is no possibility of access by alias for a memory access instruction that has been generated from a statement that includes the local variable judged by the first judging unit that is not subjected to address referencing.

3. The optimizing apparatus of claim 1, wherein one of the types for classifying the plurality of variables by the resource assigning means is a temporary variable that has been inserted out of convenience into an intermediate code statement when the statements in the source program are converted into intermediate code statements;

the judging means includes a second judging unit for judging whether the access target of the memory access instruction corresponds to a temporary variable, in accordance with the classification results of the resource assigning means; and the appending means adds a mark showing that there is no possibility of access by alias for a memory access instruction that has been generated from an intermediate code statement that includes the temporary variable judged by the second judging unit.

4. The optimizing apparatus of claim 1, wherein the instruction generating means classifies each instruction that saves a stored value of a register, as the type of instruction not corresponding to any of the statements;

the judging means includes a third judging unit for judging whether the memory access instruction is an instruction that saves a stored value of a register, in accordance with the classification results of the instruction generating means; and the appending means adds a mark showing that there is no possibility of access by alias for the memory access instruction judged by the third judging unit to be an instruction that saves a stored value of a register.

5. The optimizing apparatus of claim 1, wherein the optimizing means includes:

a detecting unit for detecting all memory access instructions in the sequence of instructions;

a selecting unit for selecting a memory access instruction, out of the detected memory access instructions, that has not been given a mark;

a link forming unit for forming a directed link between a memory access instruction that uses indirect addressing and a memory access instruction selected by the selecting unit to show that an order of a pair of linked instructions cannot be reversed; and a scheduling unit for rearranging the sequence of instructions to suit a pipeline architecture, while ensuring the orders of pairs of linked instructions are not reversed.

6. The optimizing apparatus of claim 5, wherein the scheduling unit extracts a pair of instructions that cause a hazard from the sequence of instructions and inserts a different instruction between the pair of instructions when rearranging the sequence of instructions.

7. The optimizing apparatus of claim 6, wherein one of the types for classifying the plurality of variables by the resource assigning means is a local variable that is not subjected to address referencing in the source program;

the judging means includes a first judging unit for judging whether the access target of the memory access instruction corresponds to a local variable, in accordance with the classification results of the resource assigning means; and the appending means adds a mark showing that there is no possibility of access by alias for a memory access instruction that has been generated from a statement that includes the local variable judged by the first judging unit that is not subjected to address referencing.

8. The optimizing apparatus of claim 6, wherein one of the types for classifying the plurality of variables by the resource assigning means is a temporary variable that has been inserted out of convenience into an intermediate code statement when the statements in the source program are converted into intermediate code statements;

the judging means includes a second judging unit for judging whether the access target of the memory access instruction corresponds to a temporary variable, in accordance with the classification results of the resource assigning means; and the appending means adds a mark showing that there is no possibility of access by alias for a memory access instruction that has been generated from an intermediate code statement that includes the temporary variable judged by the second judging unit.

9. The optimizing apparatus of claim 6, wherein the instruction generating means classifies each instruction that saves a stored value of a register, as the type of instruction not corresponding to any of the statements;

the judging means includes a third judging unit for judging whether the memory access instruction is an instruction that saves a stored value of a register, in accordance with the classification results of the instruction generating means; and the appending means adds a mark showing that there is no possibility of access by alias for the memory access instruction judged by the third judging unit to be an instruction that saves a stored value of a register.

10. The optimizing apparatus of claim 1, wherein the optimizing means includes:

an extracting unit for extracting an instruction that uses indirect addressing from the sequence of instructions;

a generating unit for generating an equivalence code group composed of all resource codes specified as an access target of any of a register access instruction and a memory access instruction, for the extracted instruction that uses indirect addressing;

an equivalent relation deleting unit for deleting all resource codes that are not an access target of an instruction that has been given a mark from the equivalent code group; and a transfer instruction deleting unit for judging whether any instruction located after the memory access instruction that uses indirect addressing is redundant, based on the equivalent code group after deletion of resource codes by the equivalent relation deleting unit, and for deleting each instruction judged as redundant.

11. The optimizing apparatus of claim 10, wherein one of the types for classifying the plurality of variables by the resource assigning means is a local variable that is not subjected to address referencing in the source program;

the judging means includes a first judging unit for judging whether the access target of the memory access instruction corresponds to a local variable, in accordance with the classification results of the resource assigning means; and the appending means adds a mark showing that there is no possibility of access by alias for a memory access instruction that has been generated from a statement that includes the local variable judged by the first judging unit that is not subjected to address referencing.

12. The optimizing apparatus of claim 10, wherein one of the types for classifying the plurality of variables by the resource assigning means is a temporary variable that has been inserted out of convenience into an intermediate code statement when the statements in the source program are converted into intermediate code statements;

the judging means includes a second judging unit for judging whether the access target of the memory access instruction corresponds to a temporary variable, in accordance with the classification results of the resource assigning means; and the appending means adds a mark showing that there is no possibility of access by alias for a memory access instruction that has been generated from an intermediate code statement that includes the temporary variable judged by the second judging unit.

13. The optimizing apparatus of claim 10, wherein the instruction generating means classifies each instruction that saves a stored value of a register, as the type of instruction not corresponding to any of the statements;

the judging means includes a third judging unit for judging whether the memory access instruction is an instruction that saves a stored value of a resister, in accordance with the classification results of the instruction generating means; and the appending means adds a mark showing that there is no possibility of access by alias for the memory access instruction judged by the third judging unit to be an instruction that saves a stored value of a register.

14. The optimizing apparatus of claim 1, wherein the optimizing means includes:

an extracting unit for extracting a transfer instruction from the sequence of instructions as a processed instruction;

a detecting unit for detecting a transfer instruction that has a reference target resource of the processed instruction as a definition target resource;

a generating unit for generating an equivalence code group composed of all resource codes specified as an access target of register access instructions and memory access instructions, for the detected transfer instruction;

an equivalent relation deleting unit for deleting, from the equivalent code group, all resource codes that are not an access target of an instruction that has been given a mark;

a judging unit for referring to the equivalent code group, after resource codes have been deleted by the equivalent relation deleting unit, and judging whether it is possible to replace the reference target resource of the processed instruction with the reference target resource of a detected transfer instruction;

a replacement executing unit for replacing the reference target resource of the processed instruction when replacement has been judged possible; and a transfer instruction deleting unit for deleting the transfer instruction detected by the detecting unit after the replacement has been completed.

15. The optimizing apparatus of claim 14, wherein one of the types for classifying the plurality of variables by the resource assigning means is a local variable that is not subjected to address referencing in the source program;

the judging means includes a first judging unit for judging whether the access target of the memory access instruction corresponds to a local variable, in accordance with the classification results of the resource assigning means; and the appending means adds a mark showing that there is no possibility of access by alias for a memory access instruction that has been generated from a statement that includes the local variable judged by the first judging unit that is not subjected to address referencing.

16. The optimizing apparatus of claim 14, wherein one of the types for classifying the plurality of variables by the resource assigning means is a temporary variable that has been inserted out of convenience into an intermediate code statement when the statements in the source program are converted into intermediate code statements;

the judging means includes a second judging unit for judging whether the access target of the memory access instruction corresponds to a temporary variable, in accordance with the classification results of the resource assigning means; and the appending means adds a mark showing that there is no possibility of access by alias for a memory access instruction that has been generated from an intermediate code statement that includes the temporary variable judged by the second judging unit.

17. The optimizing apparatus of claim 14, wherein the instruction generating means classifies each instruction the saves a stored value of a register, as the type of instruction not corresponding to any of the statements;

the judging means includes a third judging unit for judging whether the memory access instruction is an instruction that saves a stored value of a register, in accordance with the classification results of the instruction generating means; and the appending means adds a mark showing that there is no possibility of access by alias for the memory access instruction judged by the third judging unit to be an instruction that saves a stored value of a register.

18. The optimizing apparatus of claim 1, wherein the optimizing means includes:

an extracting unit for extracting an instruction that uses indirect addressing from the sequence of instructions;

a generating unit for generating an equivalence code group, composed of all resource codes specified as an access target of any of a register access instruction and a memory access instruction, for the extracted instruction that uses indirect addressing;

an equivalent relation deleting unit for deleting, from the equivalent code group, all resource codes that are not an access target of an instruction that has been given a mark; and a replacing unit for judging whether an operand in an instruction located after the extracted instruction that uses indirect addressing can be replaced, based on the equivalent code group after deletion by the equivalent relation deleting unit, and for replacing operands for which replacement has been judged possible.

19. The optimizing apparatus of claim 18, wherein one of the types for classifying the plurality of variables by the resource assigning means is a local variable that is not subjected to address referencing in the source program;

the judging means includes a first judging unit for judging whether the access target of the memory access instruction corresponds to a local variable, in accordance with the classification results of the resource assigning means; and the appending means adds a mark showing that there is no possibility of access by alias for a memory access instruction that has been generated from a statement that includes the local variable judged by the first judging unit that is not subjected to address referencing.

20. The optimizing apparatus of claim 18, wherein one of the types for classifying the plurality of variables by the resource assigning means is a temporary variable that has been inserted out of convenient into an intermediate code statement when the statements in the source program are converted into intermediate code statements;

the judging means includes a second judging unit for judging whether the access target of the memory access instruction corresponds to a temporary variable, in accordance with the classification results of the resource assigning means; and the appending means adds a mark showing that there is no possibility of access by alias for a memory access instruction that has been generated from an intermediate code statement that includes the temporary variable judged by the second judging unit.

21. The optimizing apparatus of claim 18, wherein the instruction generating means classifies each instruction that saves a stored value of a register, as the type of instruction not corresponding to any of the statements;

the judging means includes a third judging unit for judging whether the memory access instruction is an instruction that saves a stored value of a register, in accordance with the classification results of the instruction generating means; and the appending means adds a mark showing that there is no possibility of access by alias for the memory access instruction judged by the third judging unit to be an instruction that saves a stored value of a register.

22. A compiler for translating a source program composed of statements written in a programming language into a sequence of instructions, the translated sequence of instructions then being optimized by an optimizing apparatus, the compiler comprising:

resource assigning means for assigning a plurality of resources to a plurality of variables included in the statements composing the source program, and classifying plurality of variables into local variables and temporary variables, the local variables being a type of variable that is not subjected to address referencing in the source program, and the temporary variables being a type of variable that has been inserted out of convenience into an intermediate code statement when the statements in the source program are converted into intermediate code statements;

instruction generating means for generating the sequence of instructions based on the source program, and classifying the instructions of the generated sequence into a type of instruction which corresponds to any of the statements in the source program and a type of instruction which does not correspond to any of the statements in the source program, with each instruction that saves a stored value of a register being classified as the type of instruction which does not correspond to any of the statements; and optimizing apparatus for judging each memory access instruction included in the sequence of instructions, to determine whether a memory address specified as an access target of the memory access instruction corresponds to a variable which is accessed by an operation involving another variable in the source program, in accordance with the classification results of the resource assigning means and the instruction generating means and optimizing the sequence of instructions based on the judgment results.

23. A computer-readable recording medium that stores an optimization program for optimizing a sequence of instructions obtained as a result of a compiler translating a source program composed of statements written in a programming language, wherein the compiler includes a resource assigning step for assigning a plurality of resources to a plurality of variables included in the statements of the source program, and classifying the plurality of variables into different types; and an instruction generating step for generating the sequence of instructions based on the source program, and classifying the instructions of the generated sequence into a type of instruction which corresponds to any of the statements in the source program and a type of instruction which does not correspond to any of the statements in the source program, the optimization program comprising:

an extracting step for extracting memory access instructions from the sequence of instructions which specify a memory address as an access target;

a judging step for judging each extracted memory access instruction to determine whether a memory address specified as an access target of the memory access instruction corresponds to a variable which is accessed by an operation involving another variable in the source program, in accordance with the classification results of the resource assigning step and the instruction generating step;

an appending step for adding a mark, showing that there is no possibility of access by alias, to each extracted memory access instruction whose access target is judge as not being accessed by an operation involving another variable; and an optimizing step for referring to the marks appended by the appending step and optimizing the sequence of instructions.

24. The computer-readable recording medium of claim 23, wherein one of the types for classifying the plurality of variables by the resource assigning step is a local variable that is not subjected to address referencing in the source program;

the judging step includes a first judging substep for judging whether the access target of the memory access instruction corresponds to a local variable, in accordance with the classification results of the resource assigning step; and the appending step adds a mark showing that there is no possibility of access by alias for a memory access instruction that has been generated from a statement that includes the local variable judged by the first judging substep that is not subjected to address referencing.

25. The computer-readable recording medium of claim 23, wherein one of the types for classifying the plurality of variables by the resource assigning step is a temporary variable that has been inserted out of convenience into an intermediate code statement when the statements in the source program are converted into intermediate code statements;

the judging step includes a second judging substep for judging whether the access target of a memory access instruction corresponds to a temporary variable, in accordance with the classification results of the resource assigning step; and the appending step adds a mark showing that there is no possibility of access by alias for a memory access instruction that has been generated from a intermediate code statement that includes the temporary variable judged by the second judging substep.

26. The computer-readable recording medium of claim 23, wherein the instruction generating step classifies each instruction that saves a stored value of a register, as the type of instruction not corresponding to any of the statements;

the judging step includes a third judging substep for judging whether the memory access instruction is and an instruction that saves a stored value of a register, in accordance with the classification results of the instruction generating step;

the appending step adds a mark showing that there is no possibility of access by alias for the memory access instruction judged by the third judging substep to be an instruction that saves a stored value of a register.

27. The computer-readable recording medium of claim 23, wherein the optimizing step includes:

a detecting substep for detecting all memory access instructions in the sequence of instructions;

a selecting substep for selecting a memory access instruction, out of the detected memory access instructions, that has not been given a mark;

a link forming substep for forming a directed link between a memory access instruction that uses indirect addressing and a memory access instruction selected by the selecting substep to show that an order of a pair of linked instructions cannot be reversed; and a scheduling substep for rearranging the sequence of instructions to suit a pipeline architecture, while ensuring the orders of pairs of linked instructions are not reversed.

28. The computer-readable recording medium of claim 27, wherein the scheduling substep extracts a pair of instructions that cause a hazard from the sequence of instructions and inserts a different instruction between the pair of instructions when rearranging the sequence of instructions.

29. The computer-readable recording medium of claim 28, wherein one of the types for classifying the plurality of variables by the resource assigning step is a local variable that is not subjected to address referencing in the source program;

the judging step includes a first judging substep for judging whether the access target of the memory access instruction corresponds to a local variable, in accordance with the classification results of the resource assigning step; and the appending step adds a mark showing that there is no possibility of access by alias for a memory access instruction that has been generated from a statement that includes the local variable judged by the first judging substep that is not subjected to address referencing.

30. The computer-readable recording medium of claim 28, wherein one of the types for classifying the plurality of variables by the resource assigning step is a temporary variable that has been inserted out of convenience into an intermediate code statement when the statements in the source program are converted into intermediate code statements;

the judging step includes a seconded judging substep for judging whether the access target of a memory access instruction corresponds to a temporary variable, in accordance with the classification results of the resource assigning step; and the appending step adds a mark showing that there is no possibility of access by alias for a memory access instruction that has been generated from an intermediate code statement that includes the temporary variable judged by the second judging substep.

31. The computer-readable recording medium of claim 28,
wherein the instruction generating step classifies each instruction that saves a stored value of a register, as the type of instruction not corresponding to any of the statements;
the judging step includes a third judging substep for judging whether the memory access instruction is and an instruction that saves a stored value of a register, in accordance with the classification results of the instruction generating step;
the appending step adds a mark showing that there is no possibility of access by alias for the memory access instruction judged by the third judging substep to be an instruction that saves a stored value of a register.

32. The computer-readable recording medium of claim 23,
wherein the optimizing step includes:
an extracting substep for extracting an instruction that uses indirect addressing from the sequence of instructions;
a generating substep for generating an equivalence code group composed of all resource codes specified as an access target of any of a register access instruction and a memory access instruction, for the extracted instruction that uses indirect addressing;
an equivalent relation deleting substep for deleting all resource codes that are not an access target of an instruction that has been given a mark from the equivalent code group; and
a transfer instruction deleting substep for judging whether any instruction located after the memory access instruction that uses indirect addressing is redundant, based on the equivalent code group after deletion of resource codes by the equivalent relation deleting substep, and for deleting each instruction judged as redundant.

33. The computer-readable recording medium of claim 32,
wherein one of the types for classifying the plurality of variables by the resource assigning step is a local variable that is not subjected to address referencing in the source program;
the judging step includes a first judging substep for judging whether the access target of the memory access instruction corresponds to a local variable, in accordance with the classification results of the resource assigning step; and
the appending step adds a mark showing that there is no possibility of access by alias for a memory access instruction that has been generated from a statement that includes the local variable judged by the first judging substep that is not subjected to address referencing.

34. The computer-readable recording medium of claim 32,
wherein one of the types for classifying the plurality of variables by the resource assigning step is a temporary variable that has been inserted out of convenience into an intermediate code statement when the statements in the source program are converted into intermediate code statements;
the judging step includes a seconded judging substep for judging whether the access target of a memory access instruction corresponds to a temporary variable, in accordance with the classification results of the resource assigning step; and the appending step adds a mark showing that there is no possibility of access by alias for a memory access instruction that has been generated from intermediate code statement that includes the temporary variable judged by the second judging substep.

35. The computer-readable recording medium of claim 32,
wherein the instruction generating step classifies each instruction that saves a stored value of a register, as the type of instruction not corresponding to any of the statements;
the judging step includes a third judging substep for judging whether the memory access instruction is and an instruction that saves a stored value of a registers in accordance with the classification results of the instruction generating step;
the appending step adds a mark showing that there is no possibility of access by alias for the memory access instruction judged by the third judging substep to be an instruction that saves a stored value of a register.

36. The computer-readable recording medium of claim 23,
wherein the optimizing step includes:
an extracting substep for extracting a transfer instruction from the sequence of instructions as a processed instruction;
a detecting substep for detecting a transfer instruction that has a reference target resource of the processed instruction as a definition target resource;
a generating substep for generating an equivalence code group composed of all resource codes specified as an access target of register access instructions and memory access instructions, for the detected transfer instruction;
an equivalent relation deleting substep for deleting, from the equivalent code group, all resource codes that are not an access target of an instruction that has been given a mark;
a judging substep for referring to the equivalent code group, after resource codes have been deleted by the equivalent relation deleting substep, and judging whether it is possible to replace the reference target resource of the processed instruction with the reference target resource of a detected transfer instruction;
a replacement executing substep for replacing the reference target resource of the processed instruction when replacement has been judged possible; and
a transfer instruction deleting substep for deleting the transfer instruction detected by the detecting substep after the replacement has been completed.

37. The computer-readable recording medium of claim 36,
wherein one of the types for classifying the plurality of variables by the resource assigning step is a local variable that is not subjected to address referencing in the source program;
the judging step includes a first judging substep for judging whether the access target of the memory access instruction corresponds to a local variable, in accordance with the classification results of the resource assigning step; and
the appending step adds a mark showing that there is no possibility of access by alias for the memory access instruction that has been generated from a statement that includes the local variable judged by the first judging substep that is not subjected to address referencing.

38. The computer-readable recording medium of claim 36,
- wherein one of the types for classifying the plurality of variables by the resource assigning step is a temporary variable that has been inserted out of convenience into an intermediate code statement when the statements in the source program are converted into intermediate code statements;
- the judging step includes a seconded judging substep for judging whether the access target of a memory access instruction corresponds to a temporary variable, in accordance with the classification results of the resource assigning step; and
- the appending step adds a mark showing that there is no possibility of access by alias for a memory access instruction that has been generated from an intermediate code statement that includes the temporary variable judged by the second judging substep.

39. The computer-readable recording medium of claim 36,
- wherein the instruction generating step classifies each instruction that saves a stored value of a register, as the type of instruction not corresponding to any of the statements;
- the judging step includes a third judging substep for judging whether the memory access instruction is and an instruction that saves a stored value of a register, in accordance with the classification results of the instruction generating step;
- the appending step adds a mark showing that there is no possibility of access by alias for the memory access instruction judged by the third judging substep to be an instruction that saves a stored value of a register.

40. The computer-readable recording medium of claim 23,
- wherein the optimizing step includes:
  - an extracting substep for extracting an instruction that uses indirect addressing from the sequence of instructions;
  - a generating substep for generating an equivalence code group, composed of all resource codes specified as an access target of any of a register access instruction and a memory access instruction, for the extracted instruction that uses indirect addressing;
  - an equivalent relation deleting substep for deleting, from the equivalent code group, all resource codes that are not an access target of an instruction that has been given a mark; and
  - a replacing substep for judging whether an operand in an instruction located after the extracted instruction that uses indirect addressing can be replaced, based on the equivalent code group after deletion by the equivalent relation deleting substep, and for replacing operands for which replacement has been judged possible.

41. The computer-readable recording medium of claim 40,
- wherein one of the types for classifying the plurality of variables by the resource assigning step is a local variable that is not subjected to address referencing in the source program;
- the judging step includes a first judging substep for judging whether the access target of the memory access instruction corresponds to a local variable, in accordance with the classification results of the resource assigning step; and
- the appending step adds a mark showing that there is no possibility of access by alias for a memory access instruction that has been generated from a statement that includes the local variable judged by the first judging substep that is not subjected to address referencing.

42. The computer-readable recording medium of claim 40,
- wherein one of the types for classifying the plurality of variables by the resource assigning step is a temporary variable that has been inserted out of convenience into an intermediate code statement when the statements in the source program are converted into intermediate code statements;
- the judging step includes a seconded judging substep for judging whether the access target of a memory access instruction corresponds to a temporary variable, in accordance with the classification results of the resource assigning step; and
- the appending step adds a mark showing that there is no possibility of access by alias for a memory access instruction that has been generated from an intermediate code statement that includes the temporary variable judged by the second judging substep.

43. The computer-readable recording medium of claim 40,
- wherein the instruction generating step classifies each instruction that saves a stored value of a register, as the type of instruction not corresponding to any of the statements;
- the judging step includes a third judging substep for judging whether the memory access instruction is and an instruction that saves a stored value of a register, in accordance with the classification results of the instruction generating step;
- the appending step adds a mark showing that there is no possibility of access by alias for the memory access instruction judged by the third judging substep to be an instruction that saves a stored value of a register.

44. A computer-readable recording medium that stores a compiler program that translates a source program composed of statements written in a programming language into a sequence of instructions, the translated sequence of instructions then being optimized by an optimization program, the compiler program comprising:
- a resource assigning step for assigning a plurality of resources to a plurality of variables included in the statements composing the source program, and classifying the plurality of variables into local variables and temporary variables, the local variables being a type of variable that is not subjected to address referencing in the source program, and the temporary variables being a type of variable that has been inserted out of convenience into an intermediate code statement when the statements in the source program are converted into intermediate code statements;
- an instruction generating step for generating the sequence of instructions based on the source program, and classifying the instructions of the generated sequence into a type of instruction which corresponds to any of the statements in the source program and a type of instruction which does not correspond to any of the statements in the source program, with each instruction that saves a stored value of a register being classified as the type of instruction which does not correspond to any of the statements; and a judging step for judging each memory access instruction included in the sequence of instructions, to determine whether a memory address specified as an access target of the memory access instruction corresponds to a variable which is accessed by an operation involving another variable in the source program, in accordance with the classification results of the resource assigning step and the instruction generating step, and optimizing the sequence of instructions based on the judgement results.

* * * * *